US006766216B2

(12) United States Patent
Erichsen et al.

(10) Patent No.: US 6,766,216 B2
(45) Date of Patent: Jul. 20, 2004

(54) METHOD AND SYSTEM FOR AUTOMATED SOFTWARE CONTROL OF WATERJET ORIENTATION PARAMETERS

(75) Inventors: Glenn A. Erichsen, Everett, WA (US); Jiannan Zhou, Renton, WA (US); Mira K. Sahney, Seattle, WA (US); Michael Knaupp, Zaisenhausen (DE)

(73) Assignee: Flow International Corporation, Kent, WA (US)

( * ) Notice: Subject to any disclaimer, the term of this patent is extended or adjusted under 35 U.S.C. 154(b) by 2 days.

(21) Appl. No.: 09/940,687

(22) Filed: Aug. 27, 2001

(65) Prior Publication Data

US 2003/0167104 A2 Sep. 4, 2003

(51) Int. Cl.$^7$ ................................. G06F 19/00
(52) U.S. Cl. ................. 700/160; 700/159; 700/182; 83/72; 83/177
(58) Field of Search ............... 700/182, 34, 159, 700/160, 180, 281, 186, 188; 83/72, 177

(56) References Cited

U.S. PATENT DOCUMENTS

| | | | |
|---|---|---|---|
| 5,372,540 A | 12/1994 | Burch et al. | 452/156 |
| 5,508,596 A | 4/1996 | Olsen | 318/567 |
| 5,584,016 A * | 12/1996 | Varghese et al. | 700/97 |
| 5,854,744 A * | 12/1998 | Zeng et al. | 700/34 |
| 6,077,152 A * | 6/2000 | Warehime | 451/75 |
| 6,155,245 A | 12/2000 | Zanzuri | 125/12 |
| 6,200,203 B1 * | 3/2001 | Xu et al. | 451/99 |

FOREIGN PATENT DOCUMENTS

| | | |
|---|---|---|
| EP | 0 307 174 A1 | 3/1989 |
| FR | 2 699 852 | 7/1994 |
| WO | WO 95/21044 | 8/1995 |

OTHER PUBLICATIONS

Arola and Ramulu, "Abrasive Waterjet Machining of Titanium Alloy," in *Proceedings of the 8$^{th}$ American Water Jet Conference*, WaterJet Technology Association, Houston, TX, Aug. 26–29, 1995, pp. 389–408.

(List continued on next page.)

*Primary Examiner*—Leo Picard
*Assistant Examiner*—Alexander Kosowski
(74) *Attorney, Agent, or Firm*—Seed IP Law Group PLLC

(57) ABSTRACT

Methods and systems for automating the control of fluid jet orientation parameters are provided. Example embodiments provide a Dynamic Waterjet Control System (a "DWCS") to dynamically control the orientation of the jet relative to the material being cut as a function of speed and other process parameters. Orientation parameters include, for example, the x-y position of the jet along the cutting path, as well as three dimensional orientation parameters of the jet, such as stand-off compensation values and taper and lead angles of the cutting head. In one embodiment, the DWCS uses a set of predictive models to determine these orientation parameters. The DWCS preferably comprises a motion program generator/kernel, a user interface, one or more replaceable orientation and process models, and a communications interface to a fluid jet apparatus controller. Optionally the DWCS also includes a CAD module for designing the target piece. In operation, the motion program generator receives input from the CAD design module and the user interface to build a motion program that can be forwarded to and executed by the controller to control the cutting process. The replaceable models provide the motion program generator with access to sets of mathematical models that are used to determine appropriate jet orientation and process parameters. For example, in some environments, these equations are used to generate the x-position, y-position, standoff compensation value, lead angle, and taper angle of each command. The DWCS also provides two way communication between itself and the controller. The controller functions are used, for example, to display the cutting path in progress while the target piece is being cut out of the workpiece. They are also used to obtain current values of the cutting apparatus, such as the current state of attached mechanical and electrical devices.

172 Claims, 21 Drawing Sheets

OTHER PUBLICATIONS

Arola and Ramulu, "Mechanisms of Material Removal in Abrasive Waterjet Machining of Common Aerospace Materials," in *Proceedings of the 7th American Water Jet Conference*, WaterJet Technology Association, Seattle, WA, Aug. 28–31, 1993, pp. 43–64.

Hamatani and Ramulu, "Machinability of High Temperature Composites by Abrasive Waterjet," in *Proceedings of The Winter Annual Meeting of The American Society of Mechanical Engineers*, The American Society of Mechanical Engineers, Chicago, IL, Nov. 27–Dec. 2, 1988, pp. 49–62.

Hashish, "Applications of Precision AWJ Machining," in *Proceedings of the 6th American Water Jet Conference*, WaterJet Technology Association, Houston, TX, Aug. 24–27, 1991.

Hashish and du Plessis, "Prediction Equations Relating High Velocity Jet Cutting Performance to Stand Off Distance and Multipasses," in *Proceedings of the Winter Annual Meeting of The American Society of Mechanical Engineers*, The American Society of Mechanical Engineers, San Francisco, CA, Dec. 10–15, 1978.

Hashish, "Controlled–Depth Milling Techniques Using Abrasive–Waterjets," in *Proceedings of the 12th International Conference on Jet Cutting Technology*, BHR Group Limited, Rouen, France, Oct. 25–27, 1994, pp. 449–461.

Hashish, "Deep Hole Drilling in Metals Using Abrasive–Waterjets," in *Proceedings of the 13th International Conference on Jetting Technology*, BHR Group Limited, Sardinia, Italy, Oct. 29–31, 1996, pp. 691–707.

Hashish, "Status and Potential of Waterjet Machining of Composites," in *Proceedings of the 10th American Waterject Conference*, WaterJet Technology Association, Houston, TX, Aug. 14–17, 1999, pp. 811–827.

Hashish, "Turning, Milling, and Drilling With Abrasive–Waterjets," in *Proceedings of the 9th International Symposium on Jet Cutting Technology*, BHRA, Sendai, Japan, Oct. 4–6, 1988, pp. 113–131.

Henning and Anders, "Cutting–edge quality improvements through geometrical modelling," in *Proceedings of the 14th International Conference on Jetting Technology*, BHR Group Limited, Brugge, Belgium, Sep. 21–23, 1998.

Henning, "Computer Aided Manufacturing for Three–Dimensional Abrasive Water Jet Machining," in *Proceedings of the 9th American Waterjet Conference*, WaterJet Technology Association, Dearborn, MI, Aug. 23–26, 1997.

Holmqvist and Öjmertz, "Influence of Abrasive Waterjet Cutting on the Fatique Properties of Extra High–Strength Steel," in *Proceedings of the 10th American Waterjet Conference*, WaterJet Technology Association, Houston, TX, Aug. 14–17, 1999, pp. 1–13.

Jenkins et al., "Abrasive Waterjet Machining Effects on the High Temperature Degradation and Mechanical Properties of a Ceramic Matrix Composite," in *Proceedings of the 9th American Waterjet Conference*, WaterJet Technology Association, Dearborn, MI, Aug. 23–26, 1997, pp. 157–171.

Ramulu and Arola, "Abrasive Waterjet Process Dependent Performance of Polymer Composites Under Static and Dynamic Loading," in *Proceedings of the 9th American Waterjet Conference*, WaterJet Technology Association, Dearborn, MI, Aug. 23–26, 1997, pp. 29–46.

Ramulu et al., "Abrasive Waterjet Drilling and Cutting Mechanisms in Continuous–Fiber Ceramic Composites," *Proceedings of the 9th American Waterjet Conference*, WaterJet Technology Association, Dearborn, MI, Aug. 23–26, 1997, pp. 109–132.

Reichman and Cheung, "Waterjet Cutting of Deep–Kerfs," in *Proceedings of the Fourth International Symposium on Jet Cutting Technology*, BHRA Fluid Engineering, Canterbury, England, Apr. 12–14, 1978, pp. E2–11 and E2–21.

Sheridan et al., "Microstructural and Mechanical Characterization of Threaded Composite Tubes Machined Using AWJ Cutting," in *Proceedings of the 8th American Water jet Conference*, WaterJet Technology Association, Houston, TX, Aug. 26–29, 1995, pp. 245–258.

Singh et al., "Comprehensive Evaluation of Abrasive Waterjet Cut Surface Quality," in *Proceedings of the 6th American Water Jet Conference*, WaterJet Technology Association, Houston, TX, Aug. 24–27, 1991, pp. 139–161.

Whalen, "Application of Advanced Abrasive Waterjet Machining at GE Aircraft Engines," in *Proceedings of the 7th American Water Jet Conference*, WaterJet Technology Association, Seattle, WA, Aug. 28–31, 1993, pp. 883–897.

Zeng et al., "Characterization of Energy Dissipation Phenomenon in Abrasive Waterjet Cutting," in *Proceedings of the 6th American Water Jet Conference*, WaterJet Technology Association, Houston, TX, Aug. 24–27, 1991, pp. 163–177.

Ansari et al., "Effect of Waterjet Pressure on Thermal Energy Distribution in the Workpiece During Cutting With an Abrasive Waterjet," in *Proceedings of The Winter Annual Meeting of The American Society of Mechanical Engineers*, The American Society of Mechanical Engineers, Chicago, IL, Nov. 27–Dec. 2, 1988, pp. 141–148.

Hashish, "Characteristics of Surfaces Machined With Abrasive–Waterjets," in *Proceedings of The Winter Annual Meeting of The American Society of Mechanical Engineers*, The American Society of Mechanical Engineers, San Francisco, San Francisco, CA, Dec. 10–15, 1989, pp. 23–32.

Hashish, "Machining of Advanced Composites With Abrasive–Waterjets," in *Proceedings of The Winter Annual Meeting of The American Society of Mechanical Engineers*, The American Society of Mechanical Engineers, Chicago, IL, Nov. 27–Dec. 2, 1988, pp. 1–18.

Hashish, "The Effect of Beam Angle in Abrasive–Waterjet Machining," *J. of Engineering for Industry 115*: 51–56, Feb. 1993.

Matsui et al., "High Precision Cutting Method For Metallic Materials By Abrasive Waterjet," in *Proceedings of the 6th American Water Jet Conference*, WaterJet Technology Association, Houston, TX, Aug. 24–27, 1991, pp. 127–137.

* cited by examiner

METHOD AND SYSTEM FOR AUTOMATED SOFTWARE CONTROL OF WATERJET ORIENTATION PARAMETERS

BACKGROUND OF THE INVENTION

1. Field of the Invention

The present invention relates to a method and system for automatically controlling a fluid jet, and, in particular, to methods and systems for automatically controlling lead, taper, and other orientation and process parameters of a high pressure waterjet using predictive models.

2. Background

High-pressure fluid jets, including high-pressure abrasive waterjets, are used to cut a wide variety of materials in many different industries. Abrasive waterjets have proven to be especially useful in cutting difficult, thick, or aggregate materials, such as thick metal, glass, or ceramic materials. Systems for generating high-pressure abrasive waterjets are currently available, for example the Paser 3 system manufactured by Flow International Corporation, the assignee of the present invention. An abrasive jet cutting system of this type is shown and described in Flow's U.S. Pat. No. 5,643,058, which is incorporated herein by reference. The terms "high-pressure fluid jet" and "jet" used throughout should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet, into which abrasive particles are combined as the jet flows through a mixing tube. The high-pressure abrasive waterjet is discharged from the mixing tube and directed toward a workpiece to cut the workpiece along a designated path.

Various systems are currently available to move a high-pressure fluid jet along a designated path. Such systems are commonly referred to as three-axis and five-axis machines. Conventional three-axis machines mount the cutting head assembly in such a way that it can move along an x-y plane and perpendicular along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional rotary axes, typically about one horizontal axis and one vertical axis so as to achieve in combination with the other axes, degrees of tilt and swivel.

Manipulating a jet about five axes may be useful for a variety of reasons, for example, to cut a three-dimensional shape. Such manipulation may also be desired to correct for cutting characteristics of the jet or for the characteristics of the cutting result. More particularly, as understood by one of ordinary skill in the art, a cut produced by a jet, such as an abrasive waterjet, has characteristics that differ from cuts produced by more traditional machining processes. Two of the cut characteristics that may result from use of a high-pressure fluid jet are referred to as "taper" and "trailback." FIG. 1 is an example illustration of taper. Taper refers to the angle of a plane of the cut wall relative to a vertical plane. Taper typically results in a target piece that has different dimensions on the top surface (where the jet enters the workpiece) than on the bottom surface (where the jet exits the workpiece). FIG. 2 is an example illustration of trailback. Trailback, also referred to as drag, identifies the phenomena that the high-pressure fluid jet exits the workpiece at a point behind the point of entry of the jet into the workpiece, relative to the direction of travel. These two cut characteristics, namely taper and trailback, may or may not be acceptable, given the desired end product. Taper and trailback varies depending upon the speed of the cut; thus, one known way to control excessive taper and/or trailback is to slow down the cutting speed of the system. In situations where it is desirable to minimize or eliminate taper and trailback, conventional five-axis systems have been used, primarily through manual trial and error, to apply taper and lead angle corrections to the jet as it moves along the cutting path.

SUMMARY OF THE INVENTION

In brief summary, methods and systems of the present invention provide for the automatic control of orientation parameters of a fluid jet to achieve greater control over the contour of the cut produced and the resultant piece. These methods and systems can be employed with different types of jet apparatus, such as those that control a cutting head using motion around a different number of axes. Example embodiments provide a Dynamic Waterjet Control System ("DWCS") to dynamically control the orientation of a jet relative to the material being cut as a function of speed and/or other process parameters. Orientation parameters include, for example, the x-y position of the jet along the cutting path, as well as three dimensional orientation parameters of the jet, such as the standoff compensation values and the taper and lead angles of the cutting head. In one embodiment, the DWCS uses a set of predictive models to automatically determine appropriate orientation parameters for an arbitrary geometry as functions of speed. In this manner, these models dynamically match, for each geometric entity, the speed of the cutting head to appropriate lead and taper angles under differing process conditions of the cutting head. For example, when a corner is being cut, typically the cutting head is slowed. In some cases, using the automated lead and taper angle determination techniques of the present invention, the deceleration may be lessened, while the cutting head achieves a more accurate cut.

In one embodiment, the DWCS comprises a user interface; which may be implemented as a graphical user interface (a "GUI"); a motion program generator; one or more replaceable models; and a communications interface to a controller of the cutting head. The DWCS optionally provides CAD capabilities for designing the target piece or receives CAD input by other means. In some embodiments, the DWCS resides in a separate computer workstation; while in other embodiments the DWCS resides on the controller, or a computer associated therewith.

The motion program generator dynamically generates a motion program for a controller of a jet apparatus. The generated motion instructions are dependent upon the requirements of the controller and/or the jet apparatus and, thus, the motion program generator can be tailored to generate differing types of control instructions for each type of controller.

The motion program generator automatically determines the lead and taper angle adjustments for each geometric entity as a function of the determined speed for that entity. In one embodiment, the lead and taper angle adjustments are functions of other process parameters, such as mixing tube length or orifice diameter. In another embodiment, a speed and acceleration model is used by the DWCS to determine the speed for an entity prior to determining the lead and taper angle adjustments. In some embodiments the lead and taper angle adjustments are determined at the same time as speed adjustments.

The model used by techniques of the present invention models the contour of the cut that can be achieved under varying conditions, as specified by different process parameter values. Any technique for providing values for lead and taper for an arbitrary geometry can be used to implement the lead and taper model. In some embodiments, the lead and taper model comprises sets of polynomial equations. In other embodiments, the lead and taper model comprises a look-up table of discrete values that models lead and taper angles for a set of geometries. In some embodiments, the lead and taper model models lead and taper angles as functions of speed and material thickness. In addition, one embodiment includes an angle of a tangent to the path at the current endpoint to support the determination of smoother transitions around entities such as corners or other intersections.

In yet another embodiment, the lead and taper angles can be manually overridden by an operator for a portion of or the entire cutting path. Additionally, the automated lead and taper angle adjustment can operate in conjunction with manual override of some parameters, but not others.

In some embodiments, some or all of the process of automatically determining one or more of the orientation parameters and controlling the cutting head accordingly are performed by the controller of the jet apparatus or software/hardware/firmware directly connected to the controller.

DETAILED DESCRIPTION OF THE INVENTION

Embodiments of the present invention provide computer- and network-based methods and systems for automatically controlling lead and taper angles and other orientation parameters of a waterjet to achieve superior control over the contour of the cut and resulting piece generated by the waterjet. Example embodiments of the present invention provide a Dynamic Waterjet Control System ("DWCS") to dynamically control the orientation of a jet relative to the material being cut as a function of speed and/or other process parameters. The DWCS automatically controls the x-axis, y-axis (2-dimensional) position of the jet along the cutting path, as well as the 3-dimensional orientation of the jet, such as the standoff position and tilt and swivel of the cutting head when appropriate, using a set of predictive models. The predictive models indicate appropriate settings for these orientation parameters to achieve desired characteristics of the contour of the cut and resulting piece. The extensive control capabilities of the DWCS allow operators to use the waterjet machinery in an automatic mode without manual intervention to manually control the jet orientation according to the prior knowledge and skill of the operator relative to the specific workpiece being cut. The automation capability of the DWCS thus supports decreased production time as well as precise control over the cutting process.

Although discussed herein in terms of waterjets, and abrasive waterjets in particular, one skilled in the art will recognize that the techniques of the present invention can be applied to any type of fluid jet, generated by high pressure or low pressure, whether or not additives or abrasives are used. In addition, one skilled in the art will recognize that these techniques can be modified to control the x-axis, y-axis, standoff, tilt angle, and lead angle jet orientation parameters as functions of process parameters other than speed, as different predictive models are developed and incorporated.

Figure 1:
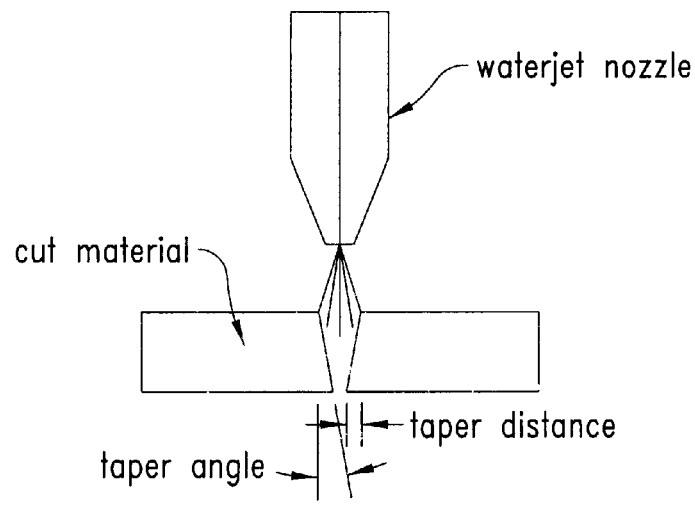
FIG. 1 is an example illustration of taper.
Figure 2:
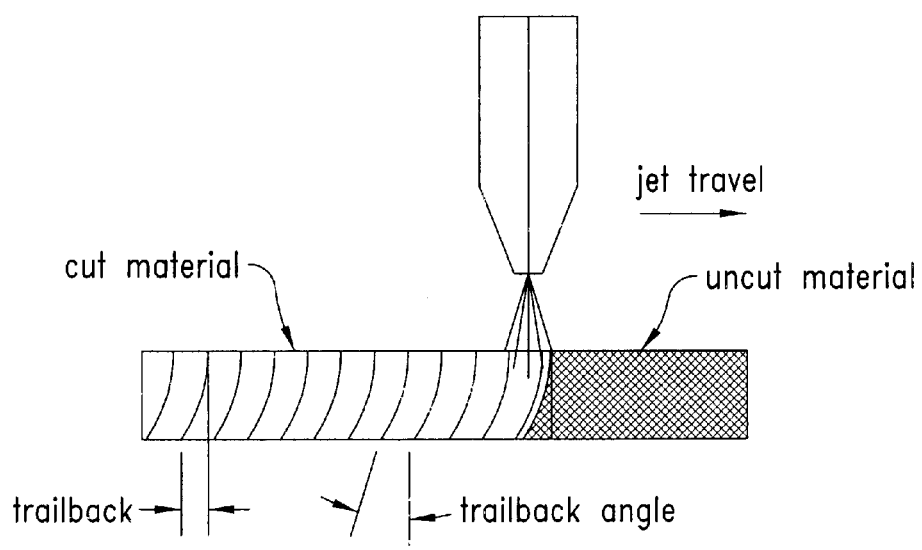
FIG. 2 is an example illustration of trailback.
Figure 3:
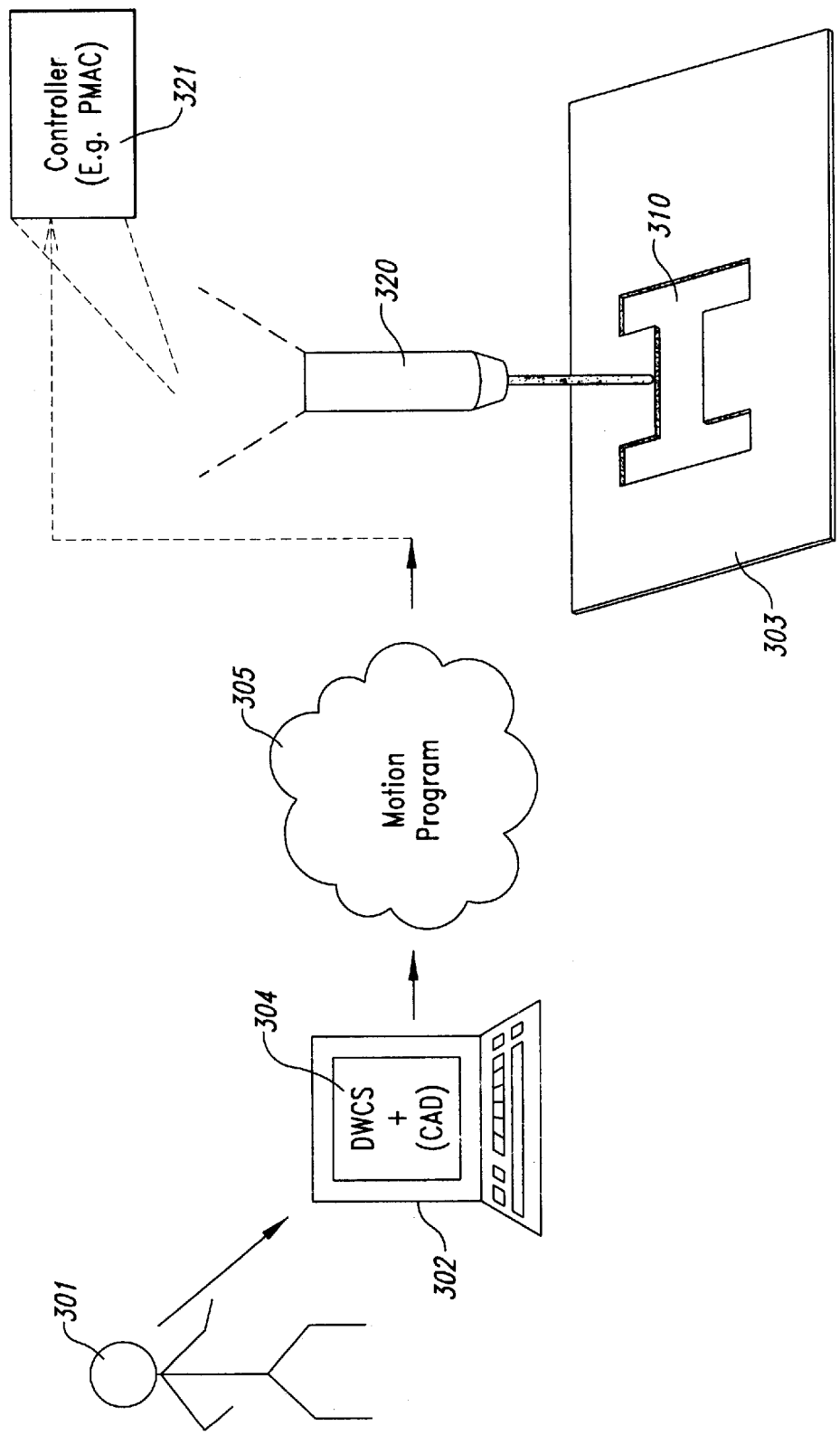
FIG. 3 is a block diagram illustrating the use of a Dynamic Waterjet Control System to produce a target piece.

FIG. 3 is a block diagram illustrating the use of a Dynamic Waterjet Control System to produce a target piece. In typical operation, an operator 301 uses a Computer-Aided Design ("CAD") program or package at a computer workstation 302, to specify a design of a piece 310 (e.g., a manufactured part) to be cut from the workpiece material 303. The computer workstation 302 is adjacent to or is remotely or directly connected to an abrasive water jet (AWJ) cutting apparatus 320, such as the high-pressure fluid jet apparatus described and claimed in concurrently filed U.S. patent application Ser. No. 09/940,689, entitled "APPARATUS FOR GENERATING AND MANIPULATING A HIGH-PRESSURE FLUID JET," which is incorporated herein by reference in its entirety. Any well-known CAD program or package can be used to specify the design of piece 310. Further, the CAD design package also may be incorporated into the Dynamic Waterjet Control System itself. The generated design is then input into the DWCS 304, which then automatically generates, as discussed in further detail in the remaining figures, a motion program 305 that specifies how the jet apparatus 320 is to be controlled to cut the workpiece material 303. When specified by the operator, the DWCS 304 sends the motion program 305 to a hardware/software controller 321 (e.g., a Computer Numeric Controller, "CNC"), which drives the jet apparatus 320 to cut the workpiece material according to the instructions contained in the motion program 305 to produce the target piece 310. Used in this manner, the DWCS provides a Computer-Aided Manufacturing process (a "CAM") to produce target pieces.

Although the DWCS described in FIG. 3 is shown residing on a computer workstation separate from, but connected to, the jet apparatus, one skilled in the art will recognize that, depending upon the actual configuration of the jet apparatus and the computers or other controllers (the jet system), the DWCS alternatively may be located on other devices within the overall jet system. For example, the DWCS may be embedded in the controller of the jet apparatus itself (as part of the software/firmware/hardware associated with the machine). In this case, the motion program is reduced and, rather, the determination of the automatic adjustments to the jet orientation parameters are embedded into the controller code itself. Or, for example, the DWCS may reside on a computer system directly connected to the controller. All such combinations or permutations are contemplated by the methods and systems of the present invention, and appropriate modifications to the DWCS described, such as the specifics of the motion program and its form, are contemplated based upon the particulars of the fluid jet system and associated control hardware and software.

Figure 4:
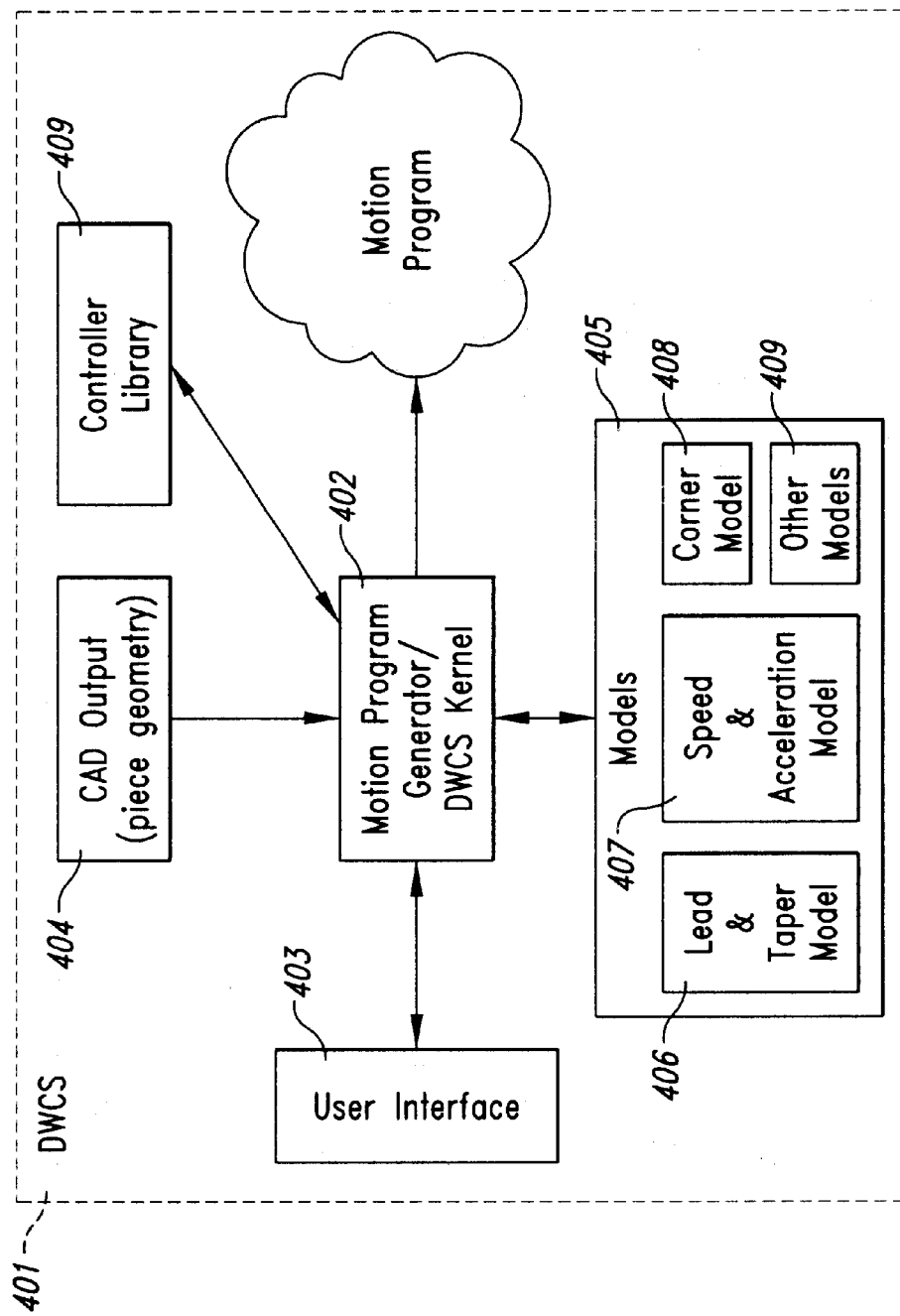
FIG. 4 is a block diagram of an example embodiment of a Dynamic Waterjet Control System.

FIG. 4 is a block diagram of an example embodiment of a Dynamic Waterjet Control System. The DWCS 401 comprises a motion program generator/kernel 402, a user interface 403, such as a graphical user interface ("GUI"), a CAD design module 404, one or more replaceable orientation or process models 405, and an interface to the jet apparatus controller 410. The motion program generator 402 receives input from the CAD design module 404 and the user interface 403 to build up a motion program that can be sent to and executed by the controller (the CNC) to control the jet. One skilled in the art will recognize that alternative arrangements and combinations of these components are equally contemplated for use with techniques of the present invention. For example, the CAD design module 404 may be incorporated into the user interface 403. In one embodiment, the user interface 403 is intertwined with the motion program generator 402 so that the user interface 403 controls the program flow and generates the motion program. In another embodiment the core program flow is segregated in a kernel module, which is separate from the motion program generator 402. The replaceable models 405 provide the motion program generator 402 with access to sets of mathematical models 406, 407, 408, and 409 that are used to determine appropriate jet orientation and cutting process parameters. Each mathematical model 406, 407, 408, and 409 comprises one or more sets of equations or tables that are used by the motion program generator 402 to generate particular values for the resultant commands in the motion program to produce desired cutting characteristics or behavior. For example, in a 5-axis machine environment, these equations are used to generate the x-position, y-position, z-standoff compensation value, lead angle, and taper angle of each command if appropriate. The replaceable models 405 preferably provide multiple and dynamically replaceable mathematical models. For example, in a preferred embodiment, the models 405 include a set of equations for generating lead and taper angle values 406; a set of equations for generating speed and acceleration values 407; a set of equations for generating modified cutting process parameter values for cutting curves, corners, etc. 408; and other models 409. The mathematical models 406, 407, 408, and 409 are typically created experimentally and theoretically based upon empirical observations and prior analysis of cutting data. In particular, as will be discussed in further detail below, the lead and taper model 406 is a predictive model that can be used to generate lead and taper angle values for an arbitrary shape. In one embodiment, the DWCS also comprises an interface to the controller 410, which provides functions for two way communication between the controller and the DWCS. These controller functions are used, for example, to display the cutting path in progress while the target piece is being cut out of the workpiece. They are also used to obtain values of the cutting apparatus, such as the current state of the attached mechanical and electrical devices.

One skilled in the art will recognize that many different arrangements and divisions of functionality of the components of a DWCS are possible. In addition, although specific details are described with respect to this example embodiment of the DWCS, such as data formats, user interface screens, code flow diagrams, menu options, etc., one skilled in the art will recognize that the techniques of the present invention can be practiced without some of the specific details described herein, or with other specific details, such as changes with respect to the ordering of the code flow diagrams, or the specific features shown on the user interface screens. Well-known structures and steps may not be shown or described in detail in order to avoid obscuring the present invention.

Figure 5:
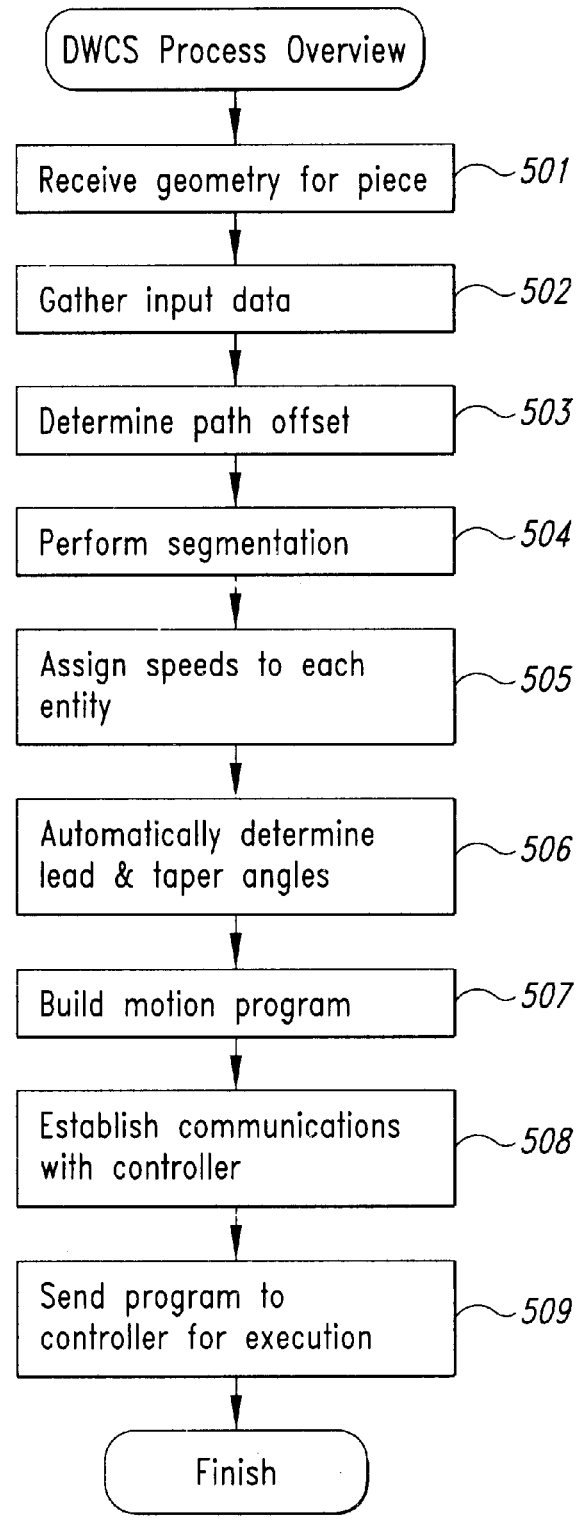
FIG. 5 is an example flow diagram of steps executed by an example embodiment of a Dynamic Waterjet Control System to cut a target piece.

FIG. 5 is an example flow diagram of steps executed by an example embodiment of a Dynamic Waterjet Control System to cut a target piece. In step 501, the DWCS gathers a variety of input data from the operator, including a design (a geometry specification) for a target piece in a CAD format, or equivalent. In addition, the customer requirements for the target piece need also to be specified and gathered, such as an indication of the surface finish, or, as sometimes referred to, an indication of the quality of the cut. Various techniques for indicating this information to the DWCS can be used. In one example embodiment, the CAD package enables an operator to specify different surface finishes for each drawing entity. These surface finishes may, for example, be indicated by a percentage speed scale; however, one skilled in the art will recognize that other scales for indicating surface finish or the quality of the cut can be used. For example, alternate scales that indicate relative speed may be used, or indications of quality such as "rough finish," "medium finish," and "smooth finish." Speed typically is traded off for surface finish (or cut quality); thus, speed and finish quality can be inferred from whatever scale is used. It is noted, however, that the DWCS can support the production of more dimensionally accurate pieces while running the jet apparatus at higher speeds, due to the automatic taper and lead angle compensations.

In step 502, the DWCS gathers process parameters, typically from an operator, although these parameters may have default values or some may be able to be queried from the jet apparatus controller. In one example embodiment, shown below in FIG. 8, the DWCS determines values for the type of material being cut; material thickness; water pressure; orifice diameter; abrasive flow rate; abrasive type; mixing tube diameter; and mixing tube length as process parameters.

In step 503, the DWCS uses the input process parameters to automatically calculate the offset path. The offset path is the path that needs to be followed when the target piece is cut to account for any width that the jet actually takes up (the width of the cut due to the jet). This prevents the production of pieces that are smaller or larger than specified. As characteristics of the jet change over time, for example, due to wear, jet process parameters need to be correspondingly modified in order to compute the correct offset. In some embodiments, the offset path is determined by the controller and appropriate transformations of the motion program orientation parameters are made by the controller.

Steps 504–507 build up a motion program by incrementally storing determined program values in a motion program data structure. Preferably, the entries in the data structure correspond to stored motion program instructions that are executable by the jet controller. In step 504, the DWCS determines the component drawing entities of the target piece design by "segmenting" the geometry into entities that are appropriate for assigning cutting speeds. This step can be performed at this time or elsewhere in the process, for example, using known, off-the-shelf software systems that provide design segmentation by modifying the CAD/CAM file. Once the segmentation is performed, then in step 505, the DWCS assigns a speed value to each drawing entity based upon known speed and acceleration models (e.g., speed model 407 in FIG. 4) and known corner models (e.g., corner model 408 in FIG. 4), which take into account speed decreases that are preferred for cutting entities like circles, arcs, and corners. Embodiments of these models are currently available, for example, in FlowMaster™ controlled shape cutting systems, currently manufactured by Flow International Corporation, and equivalents of these models or similar models are generally known in the art. For the purposes of the DWCS, any speed and acceleration model and/or corner model can be used as long as speeds can be indicated for a particular drawing entity. In general, the speed and acceleration model provides access to equations and tests that generate a scaling of speed (e.g., a percentage of the maximum capable speed of the jet apparatus) based upon known geometries, such as lines, arcs, circles, and the characteristics of the particular machine. For example, it is known to one skilled in the art that tighter radius arcs require the jet cutting to occur at slower speeds than the maximum. Further, the speed and acceleration model is used to adjust speeds for drawing entities when speed transitions are encountered based upon the acceleration characteristics of the particular jet apparatus.

In step 506, the DWCS automatically determines the tilt and swivel of the jet cutting head that is necessary to achieve the designated customer requirements by automatically determining the taper and lead angles using predictive models (e.g., lead and taper model 406 in FIG. 4). This determination will be discussed in detail with reference to FIG. 21. In summary, the taper and lead angle model generates, based upon a series of equations, optimal values for the taper and lead angles at each endpoint of each drawing entity as a function of the speed of the cutting head at that point. Specifically, if the lead and taper model determines that a segment of the target piece is to be cut slower (due to reasons such as machine deceleration or required surface finish control), then the lead and taper angles are automatically set to compensate for the speed change. Thus, the lead and taper angles are set to automatically match the speed of the cut at each endpoint and for each segment. Because the speed of the cut for a particular drawing entity is previously determined as a function of various other process parameters, for example, the thickness of the material and the mixing tube characteristics, the taper and lead angles are also indirectly functions of these other process parameters.

In step 507, the DWCS builds the final motion program making adjustments to the motion program data structure as necessary for the particular jet controller in use. Typically, CNCs and other waterjet controllers use kinematic equations to calculate the movement of the cutting head motors that is needed to produce a desired path (i.e., to calculate how the motors should be positioned to generate particular jet tool tip positions). Preferably, prior to using the cutting head, the operator aligns the cutting head apparatus using the controller, so that the kinematic equations yield motor positions that generate the desired cut. Some controllers are capable of receiving motion programs specified in terms of the jet orientation and internally use inverse kinematics to determine the actual motor positions from the jet tool tip positions. Others, however, expect to receive the motion program instructions in terms of motor positions, and not jet tool tip x-y positions and angle coordinates. In this case, when the jet tool tip positions need to be "translated" to motor positions, the DWCS in step 507 performs such translations using kinematic equations and makes adjustments to the orientation parameter values stored in the motion program data structure. In addition, standoff compensation values for the jet cutting head are determined using kinematic equations and are stored with each instruction. Standoff compensation values are the "z-axis" measurements needed to insure that the jet tool tip stays at a particular standoff amount, centered over the cutting path, regardless of the taper and lead angles. Standoff compensation values are typically a function of the distance of the jet motors pivot point to the jet tool tip.

In step 508, the DWCS establishes and/or verifies communication with the controller of the jet apparatus. In step 509, the DWCS sends the built motion program to the controller for execution. One skilled in the art will recognize that the term "controller" includes any device/software/firmware capable of directing motor movement based upon the motion program. One skilled in the art will also recognize that the term "motion program" is used herein to indicate a set of instructions that the particular jet apparatus and/or controller being used understands. The foregoing steps can accordingly be altered to accommodate the needs of any such instructions.

As mentioned, in one embodiment, the user interface of the DWCS is a graphical user interface ("GUI") that controls the entire cutting process. FIGS. 6–17 are example screen displays of various aspects of an example embodiment of the DWCS user interface. One skilled in the art will recognize that many variations of these screen displays, including the input requested, the output displayed, and the control flow exist and are contemplated to be used with the techniques of the present invention.

Figure 6:
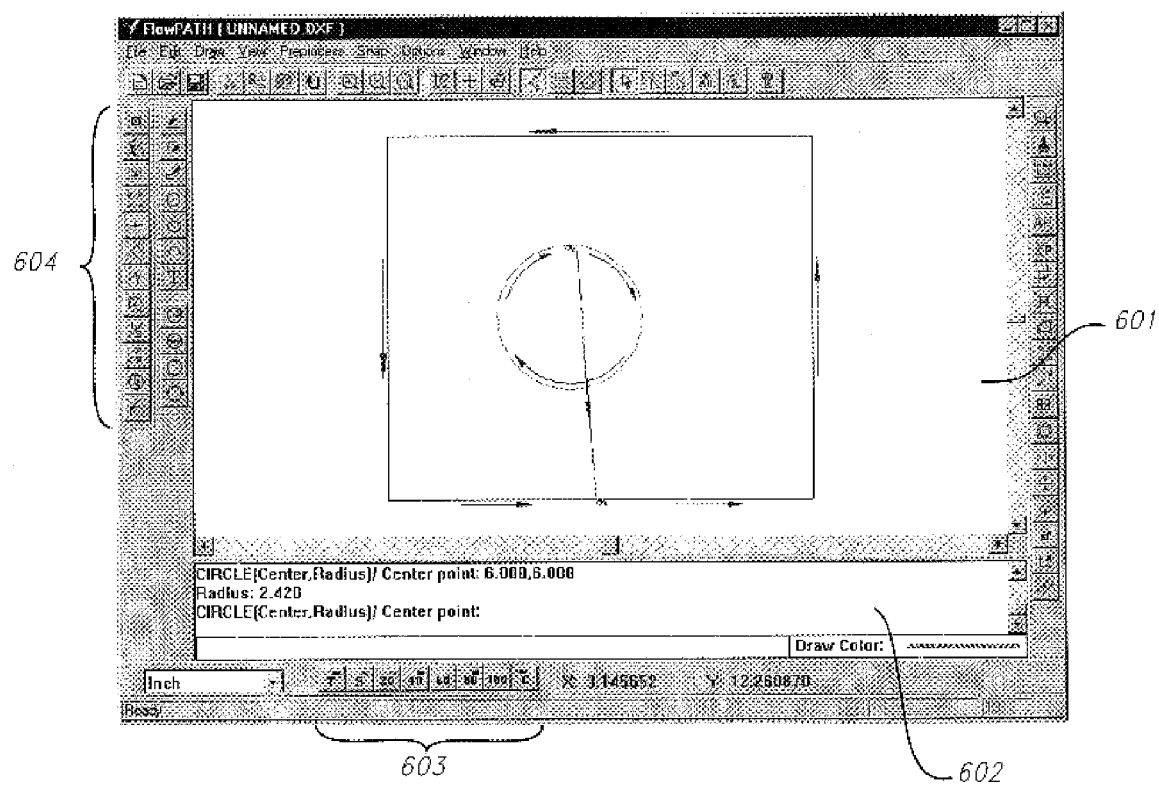
FIG. 6 is an example screen display of the user interface of an example Dynamic Waterjet Control System CAD module.

FIG. 6 is an example screen display of the user interface of an example Dynamic Waterjet Control System CAD module. An operator uses the design tools 604 to enter a design of a desired piece (part), including the order of the segments to be cut, in drawing area 601. In geometry input area 602, the CAD module receives drawing entity input from the operator for the design that is displayed in drawing area 601. Preferably, the CAD module allows the operator to also indicate surface finish requirements (or any other representation of customer requirements) for the segments of the design. The speed specification buttons 603 are used to designate the speed requirements (hence surface quality requirements) for a particular segment. In the CAD module illustrated, the color of each segment (not shown) corresponds to a percentage of maximum speed. Thus, for example, while the rectangle is drawn for example, in blue, to correspond to 40% of maximum speed, the cut-out circle is drawn, for example, in light green, to correspond to 20% of maximum speed. One skilled in the art will recognize that any type of key system may be used, including different increments and designations other than by color.

Figure 7:
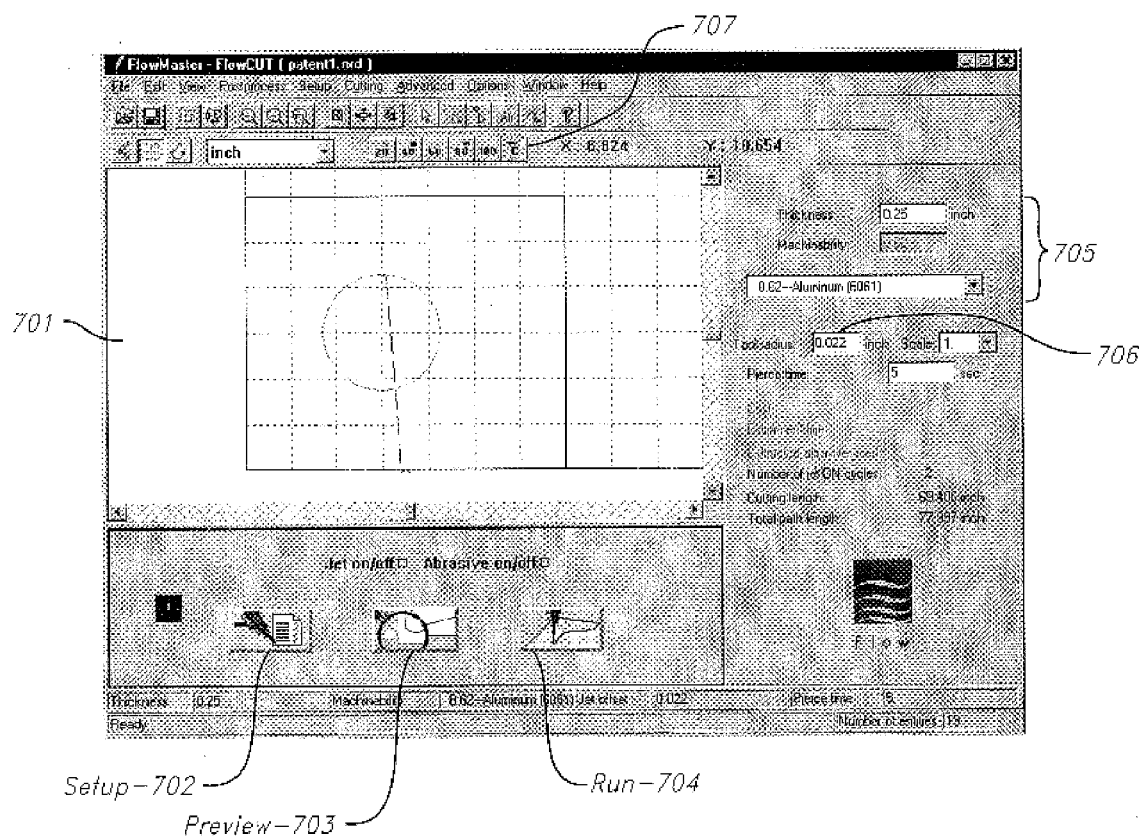
FIG. 7 is an example screen display of an introductory dialog of an example Dynamic Waterjet Control System cutting module user interface.

FIG. 7 is an example screen display of an introductory dialog of an example Dynamic Waterjet Control System cutting module user interface. Drawing display area 701 contains a view of the current design of the target piece. In this particular embodiment, the lines are color coded to correspond to the customer surface finish requirements as were specified when the design was input into the CAD program. Speed adjustment buttons 707 can be used to manually change the settings for any particular drawing entity. Among other capabilities, the introductory dialog provides access to setup options via selection of the Setup button 702, which is discussed further below with respect to FIG. 8. When the Preview button 703 is selected, the DWCS provides a simulated preview of the direction and path of the cutting head along the drawing displayed in drawing display area 701. When the Run button 704 is selected, the DWCS performs a myriad of activities relating to building up the motion program, one embodiment of which is described in detail with respect to FIGS. 20 and 21. After the DWCS has finished building the motion program and establishing communication with the jet apparatus controller, the cutting module user interface displays the controller feedback and control dialog (the "controller dialog") for actually running the cutting process. The controller dialog is discussed further below with respect to FIGS. 14–17. Other fields are available in the introductory dialog to set and display values of other process parameters. For example, attributes of the workpiece material can be set up in edit boxes 705. Also, the radius of the jet tool can be set up in edit box 706. The jet tool radius is used to determine the offset of the jet that is needed to produce the target cutting path. Typically, an offset is necessary to insure the accuracy of the cut because the jet itself has width, which is not part of the cutting path.

Figure 8:
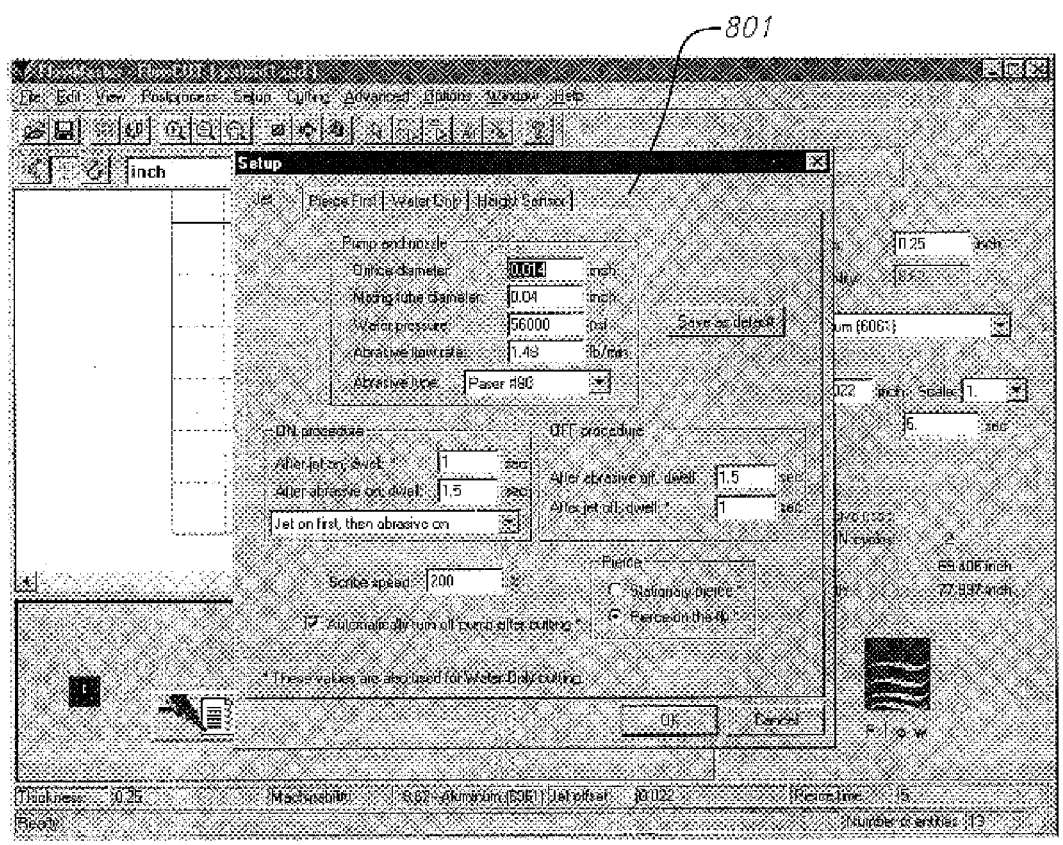
FIG. 8 is an example screen display of a setup dialog of an example Dynamic Waterjet Control System cutting module user interface.

FIG. 8 is an example screen display of a setup dialog of an example Dynamic Waterjet Control System cutting module user interface. The setup dialog 801, which supports the setting of various process parameters, is displayed in response to the selection of Setup button 702 in FIG. 7. Various process parameters such as the pump characteristics and the abrasive on/off procedures are settable through fields of dialog 801. Typically, an operator would invoke setup dialog 801 before cutting the first instance of the target piece and would then save the values for subsequent cutting.

Figure 9:
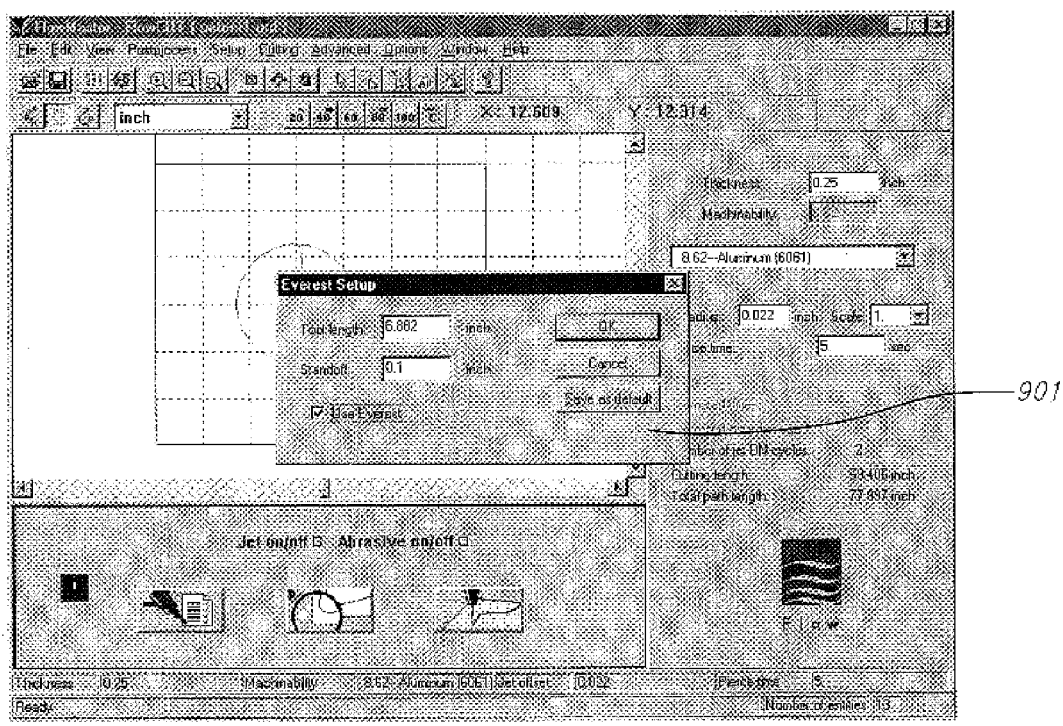
FIG. 9 is an example screen display of an advanced setup dialog of an example Dynamic Waterjet Control System cutting module user interface.

FIG. 9 is an example screen display of an advanced setup dialog of an example Dynamic Waterjet Control System cutting module user interface. The advanced setup dialog 901 is invoked when an operator selects the "Advanced" menu item from the toolbar of the introductory dialog (e.g., see FIG. 7). The operator indicates a tool length and a standoff value for the cutting head apparatus. The standoff value is the distance from the tip of the cutting head to the material. The tool length is the length from the center of the axis of rotation of the cutting head to the tip of the cutting head. These values are used with the kinematic equations to determine the transformations from the automatically determined lead and taper angles and standoff compensation values to numeric values that control the motors of the cutting head.

In the example introductory dialog discussed with reference to FIG. 7, when the operator selects the Run button 704, then the DWCS determines whether the operator has already indicated which models to use (e.g., one of the replaceable models 405 of FIG. 4). For example, if this is the first time the target piece is being cut, then the DWCS assumes that the operator has not yet set up the models and presents a dialog for receiving input regarding which models the operator desires to use. FIGS. 10–13 are example screen displays of model setup dialogs of an example Dynamic Waterjet Control System cutting module user interface. The model setup dialogs provide a spectrum of control from completely manual to completely automated. For example, they allow the operator to select whether to use the lead and taper model to automatically determine lead and taper angles or whether to provide specific values for overriding lead and taper angles for each drawing entity. One skilled in the art will recognize that other combinations are possible, including providing a portion of manual override values to an otherwise automated process. In one embodiment, "schemes" or combinations of default model setups are provided.

Figure 10:
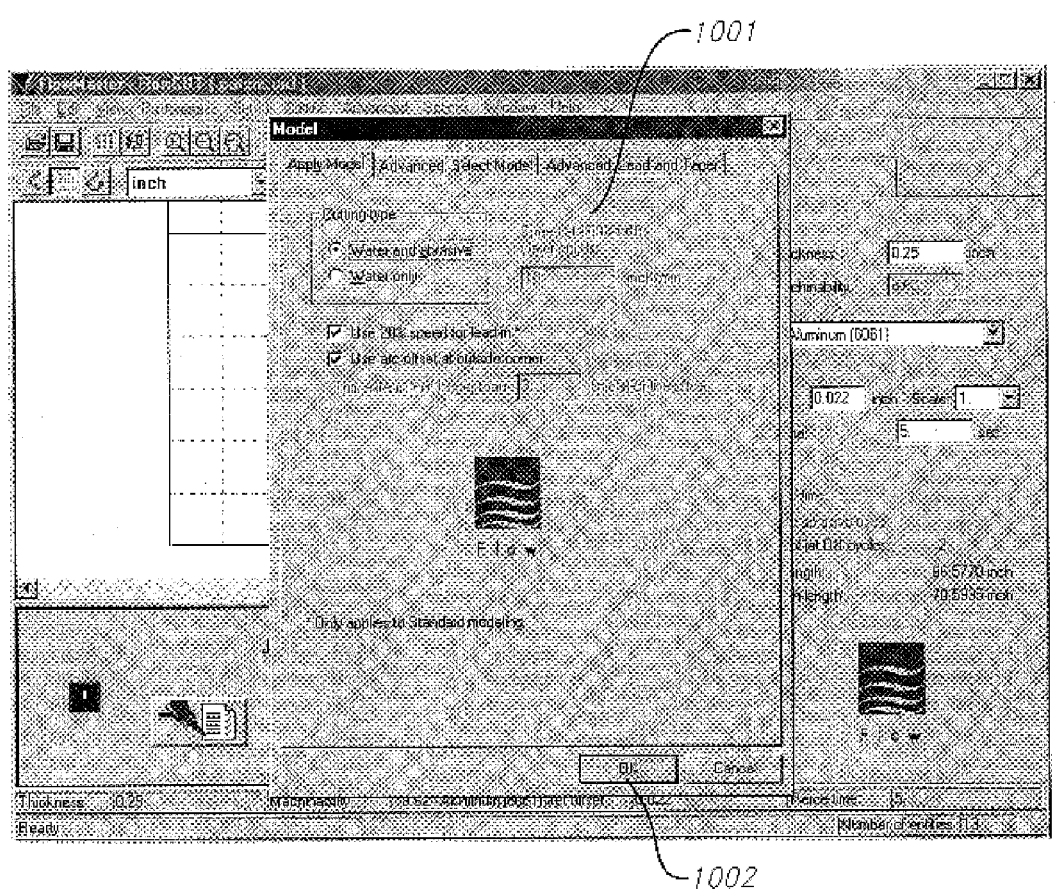
FIG. 10 is an example screen display of an apply model dialog of the model setup dialogs.

FIG. 10 is an example screen display of an apply model dialog of the model setup dialogs. The apply model dialog 1001 is used to set several process parameters that are used by the models. Once the "OK" button 1002 is selected, then the DWCS proceeds to build the motion program.

Figure 11:
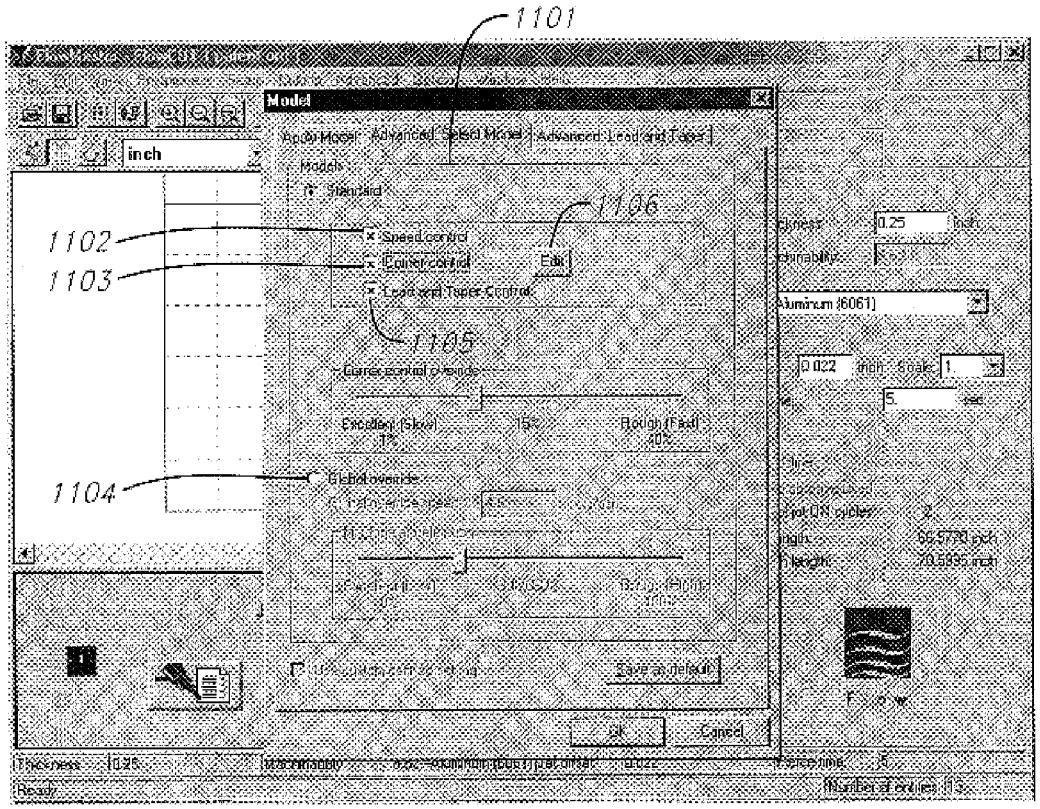
FIG. 11 is an example screen display of a select model dialog of the model setup dialogs.

FIG. 11 is an example screen display of a select model dialog of the model setup dialogs. The operator uses the select model dialog 1101 to select which models to use for a particular cutting session. The "Standard" model button 1102 is used to specify what combinations of the replaceable models (e.g., models 405 in FIG. 4) to use. It preferably provides a default set of models. The operator can preferably select one or more of the currently available models by selecting the appropriate model checkboxes 1103. Choices of different versions of these models can be added when more than one of a model type exists. For example, different corner models may be selectable in a drop down menu (not shown) or other GUI element if more than one corner model is available. By selecting the Lead and Taper Control checkbox 1105, the operate can indicate a desire to have the DWCS automatically determine lead and taper angles.

Figure 12:
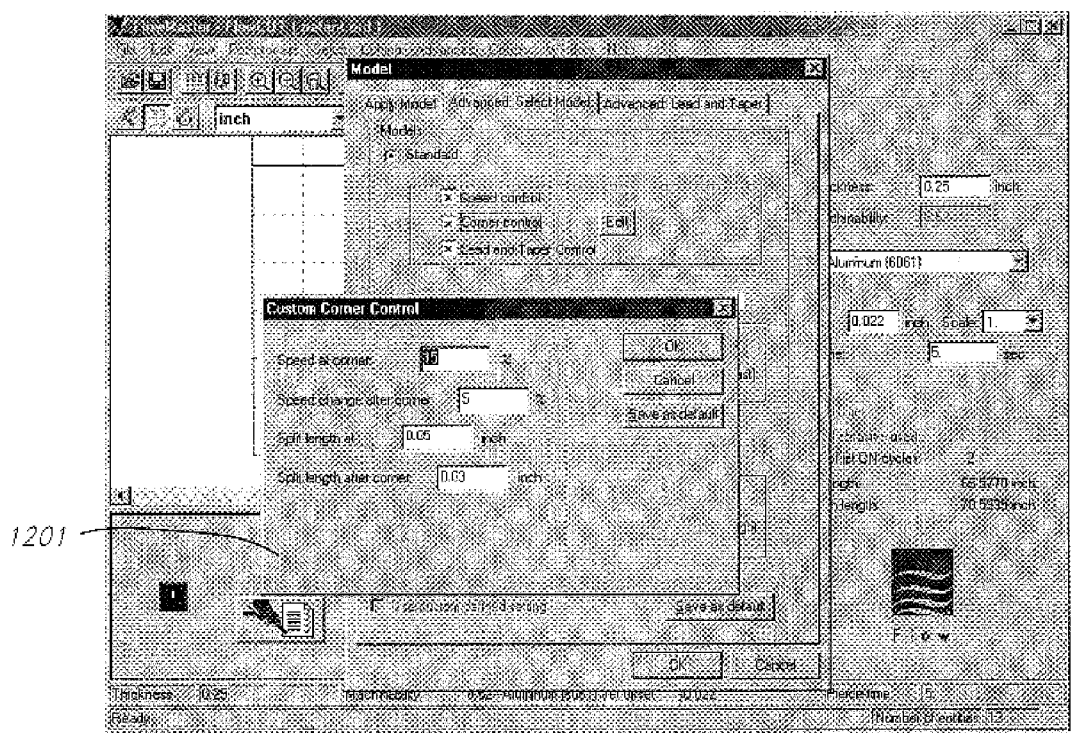
FIG. 12 is an example screen display of a custom corner edit dialog of the model setup dialogs.

FIG. 12 is an example screen display of a custom corner edit dialog of the model setup dialogs. This dialog is displayed by the DWCS in response to selecting the Edit button 1106 in FIG. 11. The customer corner edit dialog 1201 is used to manually control speed computations at corners. The operator can specify the actual speed around the corner, as well as the how the segmentation of the drawing entities should be adjusted to account for the deceleration and acceleration around corners.

Figure 13:
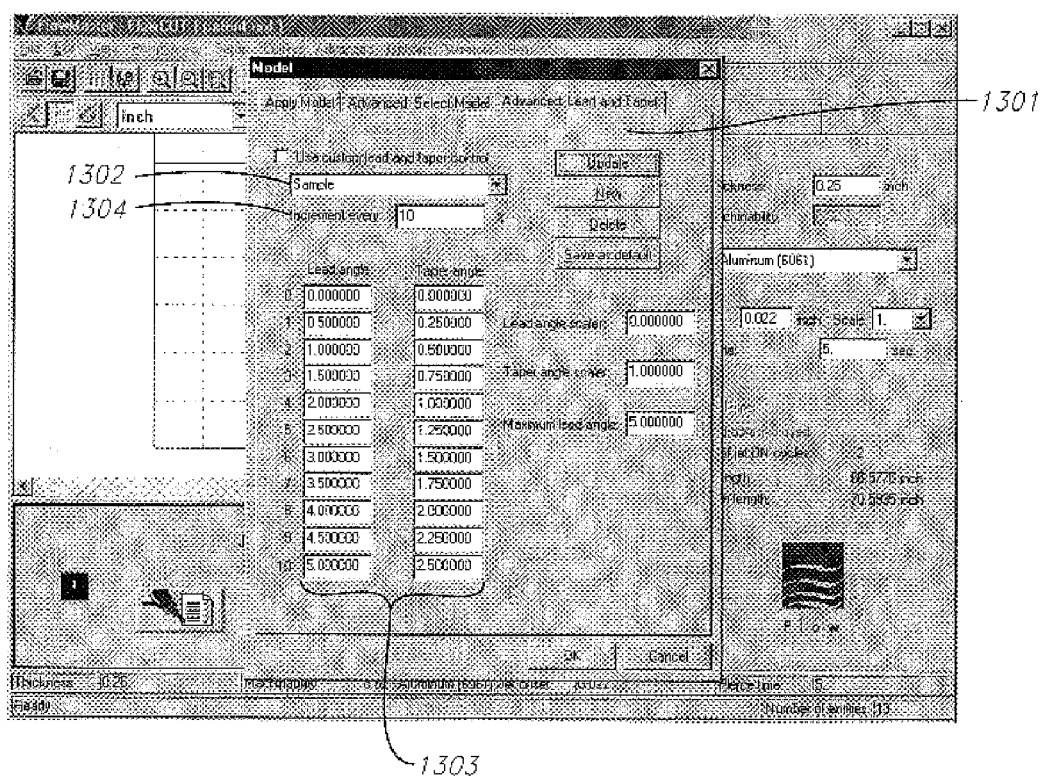
FIG. 13 is an example screen display of a custom lead and taper dialog of the model setup dialogs.

FIG. 13 is an example screen display of a custom lead and taper dialog of the model setup dialogs. Using the custom lead and taper control dialog 1301, an operator can specify a lead and taper scheme, with already determined values, for example, using scheme input field 1302. Or, the operator can specify the particular lead and taper values to use with each specified speed increment, for example by inputting values in the lead and taper angle table field 1303. Speed increments are specified in the increment field 1304. Thus, an operator could conceivable specify the lead and taper for every speed that can be performed by the cutting head by using an increment of 1%.

Figure 14:
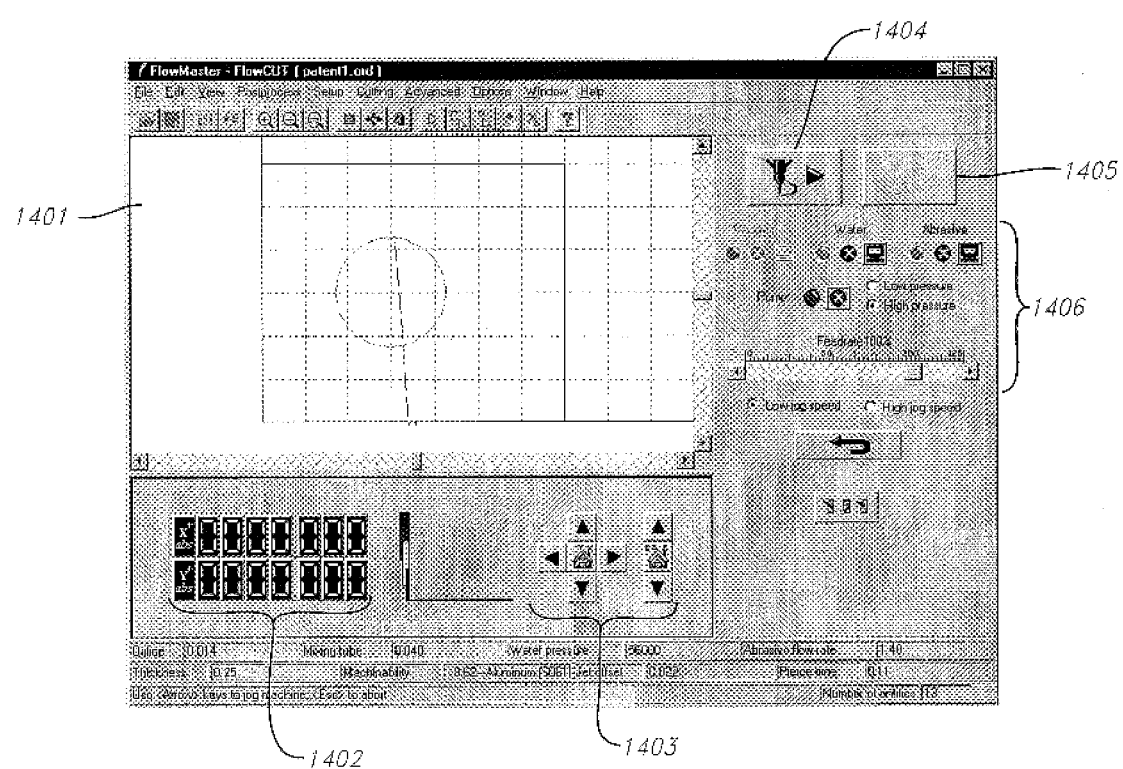
FIG. 14 is an example screen display of a jet controller feedback and control dialog of an example Dynamic Waterjet Control System cutting module user interface.

FIG. 14 is an example screen display of a jet controller feedback and control dialog of an example Dynamic Waterjet Control System cutting module user interface. Cutting display area 1401 contains a view of the target piece. The controller feedback and control dialog (controller dialog) presents current controller information to the operator as the piece is being cut. The orientation parameter feedback area 1402 displays the values of the orientation parameters from the controller's point of view. Once the cutting process is started, the operator can choose which parameters to display, as discussed with reference to FIGS. 15–17. The operator selects the home orientation buttons 1403 to set an "origin" position for the x-y plane, for the z-direction (which is used for standoff compensation), and for the lead and taper angular positions of the cutting head.

The "home" position can be either a 0,0 coordinate origin position of the jet apparatus, or any x-y or z position or angles, set by the operator using the buttons 1403. Process parameter feedback area 1406 contains current values for pump and nozzle related parameters including whether or not abrasive is being used and whether the pump is performing at high or low pressure. To begin the actual cutting process, the operator selects the cycle start button 1404. At this time, the DWCS downloads the motion program to the controller and instructs the controller to execute the program. The cycle stop button 1405 is selected to stop the current cutting process.

Figure 15:
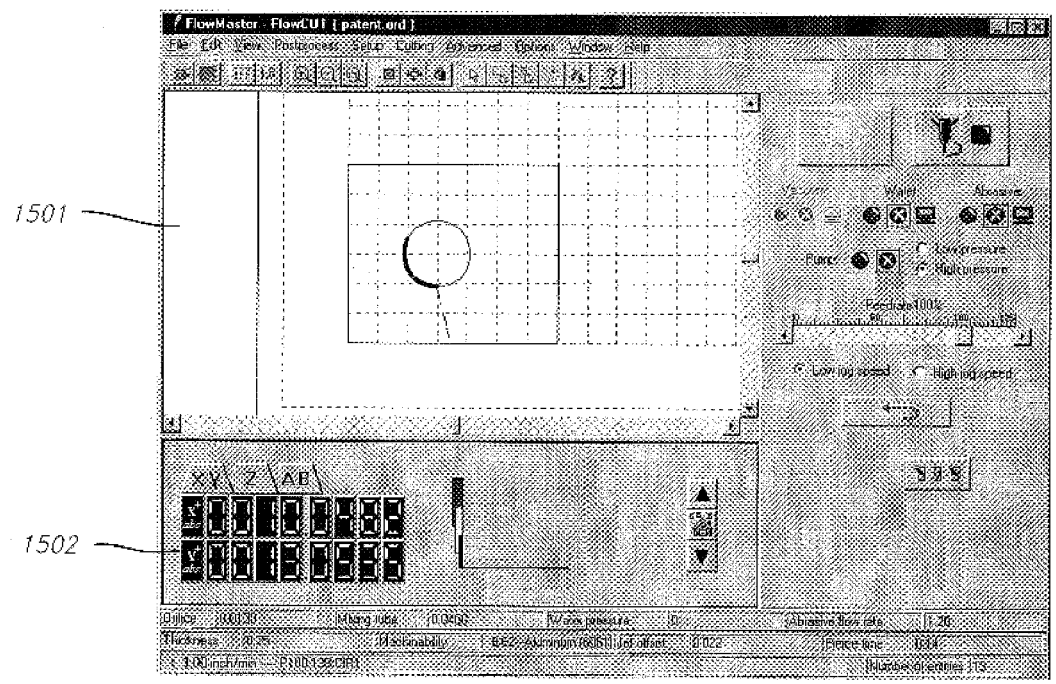
FIG. 15 is an example screen display that shows the x,y position of the current location of the jet tool tip relative to the path.
Figure 16:
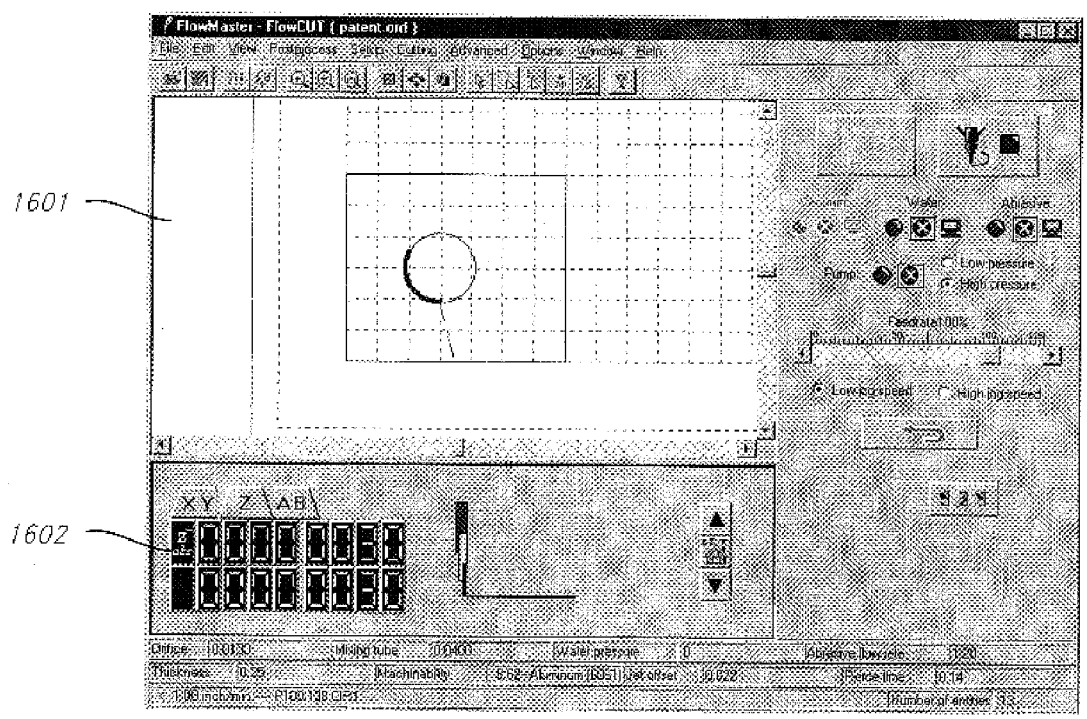
FIG. 16 is an example screen display that shows standoff compensation values of the cutting head.
Figure 17:
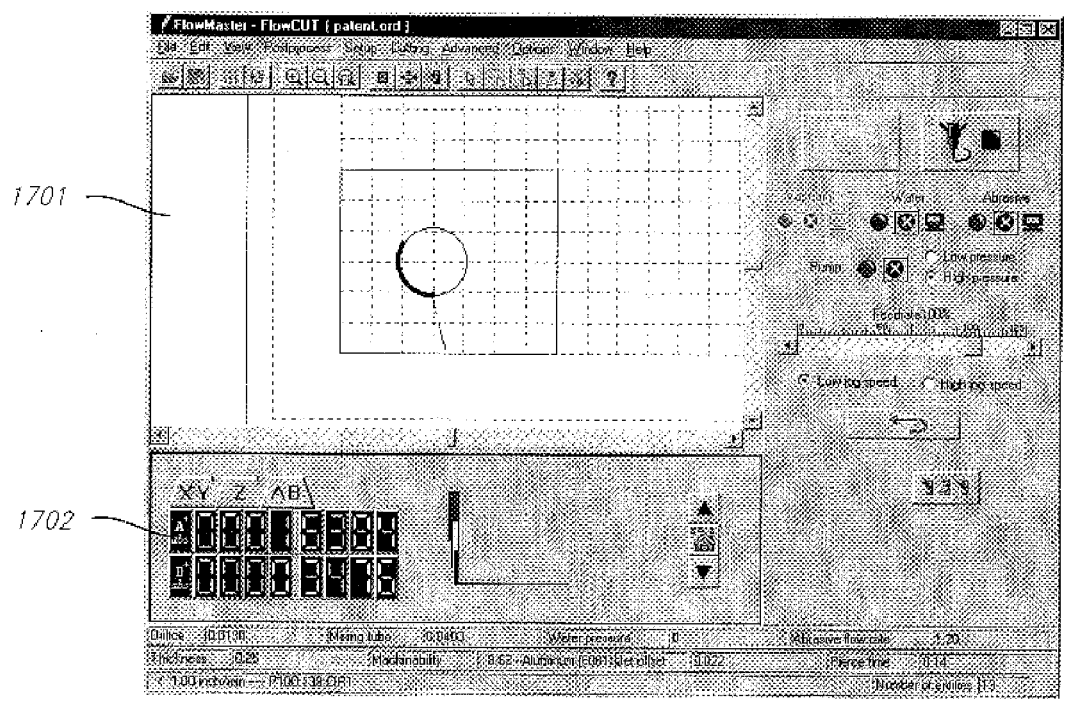
FIG. 17 is an example screen display that shows the lead and taper compensation values of the cutting head.

FIGS. 15–17 are example screen displays of controller feedback provided while the jet is cutting the workpiece. FIG. 15 is an example screen display that shows the x-y position of the current location of the jet tool tip relative to the path. In FIG. 15, cutting display area 1501 shows the cutting being performed so that the operator can view the (approximate) current position of the jet and progress of the cutting operation. Orientation parameter feedback area 1502 displays the current values of the particular orientation parameter selected for display. In FIG. 15, these values are the x and y position of the jet tool tip in relation to the "home" position of the jet apparatus.

FIG. 16 is an example screen display that shows standoff compensation values of the cutting head. Cutting display area 1601 is similar to that described with reference to FIG. 15. The orientation parameter feedback area 1602 is shown displaying the current standoff compensation value of the cutting head that corresponds to the current location of the jet tool tip. In the embodiment illustrated, these values are from the point of view of the controller, thus they reflect motor positions.

FIG. 17 is an example screen display that shows the lead and taper compensation values of the cutting head. Cutting display area 1701 is similar to that described with reference to FIG. 15. The orientation parameter feedback area 1702 is shown displaying the current lead and taper compensation values of the cutting head relative to a vertical neutral position. In the embodiment illustrated, these values are from the point of view of the controller (after the kinematic equations have been applied to the lead and taper angles), thus they reflect motor positions.

In exemplary embodiments, the Dynamic Waterjet Control System is implemented on a computer system comprising a central processing unit, a display, a memory, and other input/output devices. Exemplary embodiments are designed to operate stand-alone or in a networked environment, such as a computer system that is connected to the Internet, or in an environment where the user interface of the DWCS is controlled remotely, by a physical network or, for example, by a wireless connection. In addition, exemplary embodiments may be embedded into a computer controlled numeric controller (a CNC device) that directly controls the jet or in a computer interface of the CNC device. One skilled in the art will recognize that embodiments of the DWCS can be practiced in other environments that support the ability to generate commands that a water jet controller device can understand.

Figure 18:
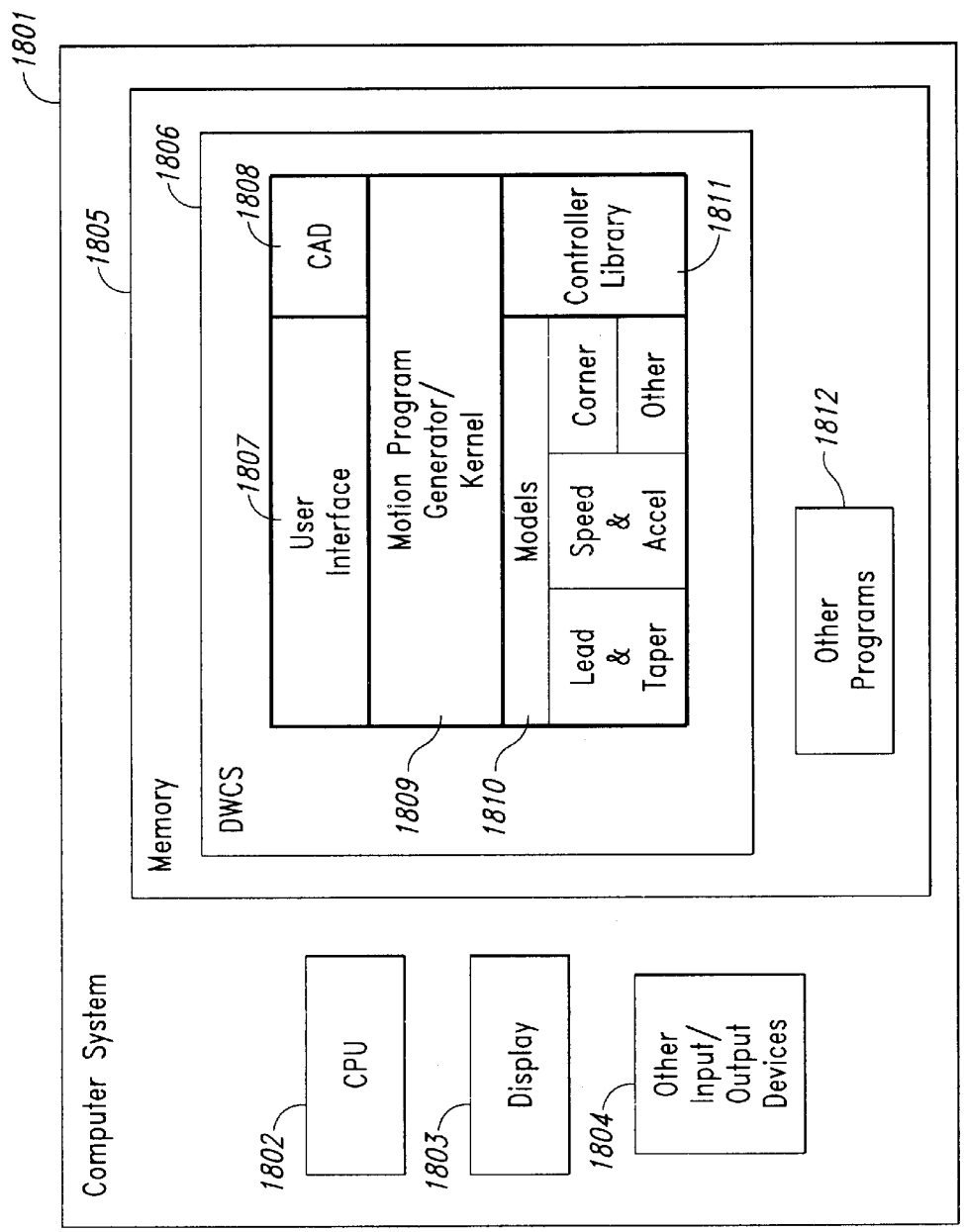
FIG. 18 is a block diagram of a general purpose computer system for practicing embodiments of the Dynamic Waterjet Control System.

FIG. 18 is a block diagram of a general purpose computer system for practicing embodiments of the Dynamic Waterjet Control System. The computer system 1801 contains a central processing unit (CPU) 1802, a display 1803, a computer memory (memory) 1805, or other computer-readable memory medium, and other input/output devices 1804. The components of the DWCS 1806 typically reside in the memory 1805 and execute on the CPU 1802. As described in FIG. 4, the DWCS 1806 comprises various components, including a user interface 1807, a CAD module 1808 (if not a part of the user interface 1807), a motion program generator/DWCS kernel 1809, one or more replaceable models 1810, and a controller interface 1811. These components are shown residing in the memory 1805. Other programs 1810 also reside in the memory 1805.

One skilled in the art will recognize that exemplary DWCSs can be implemented as one or more code modules and may be implemented in a distributed environment where the various programs shown as currently residing in the memory 1805 are instead distributed among several computer systems. For example, the replaceable models 1810, which contain preferably the lead and taper model, speed and acceleration model, the corner model, and other models, may each or in any combination reside on a different computer system than the computer system on which the motion program generator 1809 and/or the user interface 1807 reside or the CAD module 1808 resides. Also, as discussed earlier with respect to FIG. 3, one or more of these components may reside and execute on a computer associated with the controller of the jet apparatus or on a controller card. In one embodiment, the DWCS is implemented using an object-oriented programming environment such as the C++ programming language and the replaceable orientation and process models are implemented as different types of objects or classes.

Figure 19:
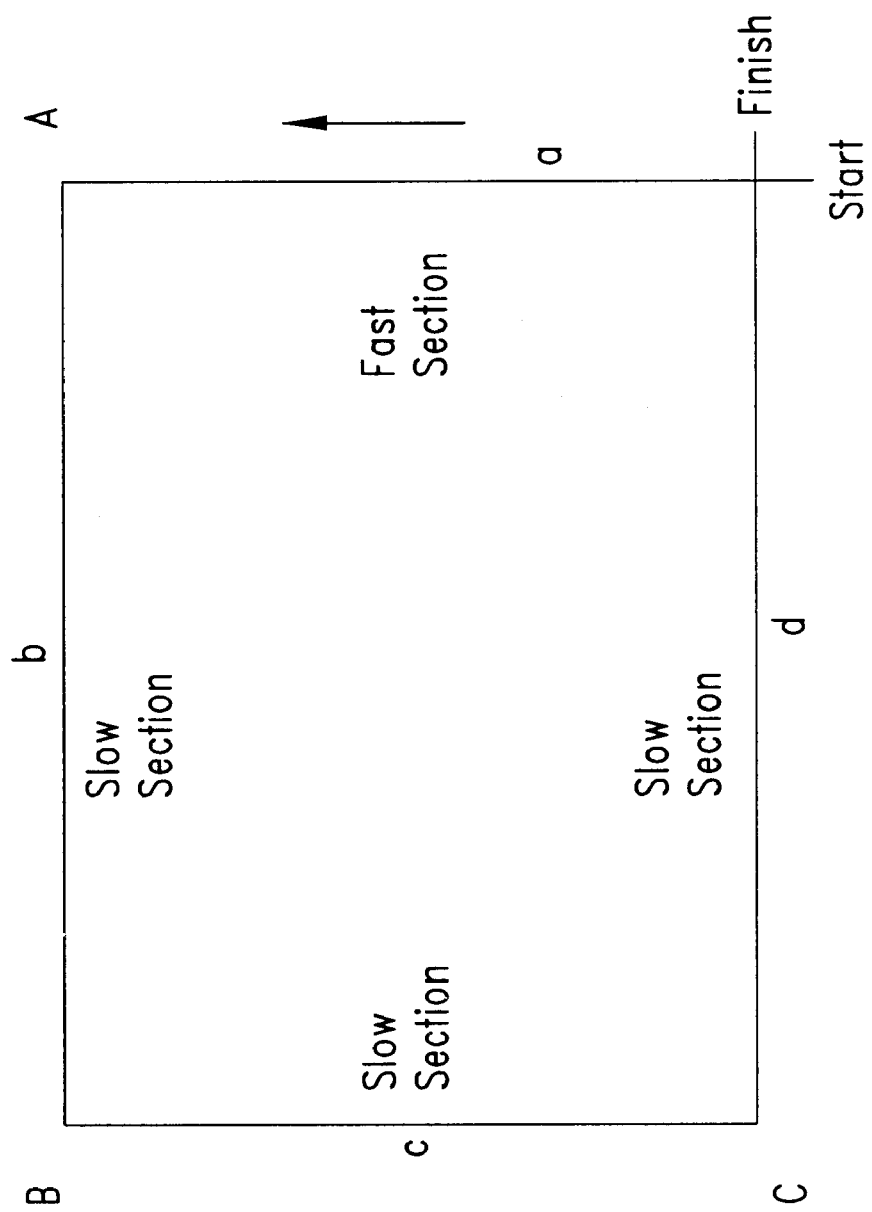
FIG. 19 is an example target piece design, which is used to illustrate how the Dynamic Waterjet Control System automates determination of the orientation and cutting process parameters.

FIG. 19 is an example target piece design, which is used to illustrate how the Dynamic Waterjet Control System automates determination of the orientation and cutting process parameters. FIG. 19 shows a rectangular shape, which is to be cut from the point labeled "Start" proceeding in a counterclockwise fashion until the point labeled "Finish." The design shows four geometric entities (lines) labeled "a," "b," "c," and "d." When cutting, the jet apparatus will progress in order around the corners labeled A, B and C. At the end of the cut, the jet will arrive at the point marked "Finish." For illustration purposes, the following description assumes that the operator has communicated a desire to cut the entity "a" at a high speed (rough surface finish) and the remaining entities "b," "c," and "d" slowly (smooth surface finish). Also, the description assumes that no part offset is required to account for the width of the cut produced by the jet.

Figure 20:
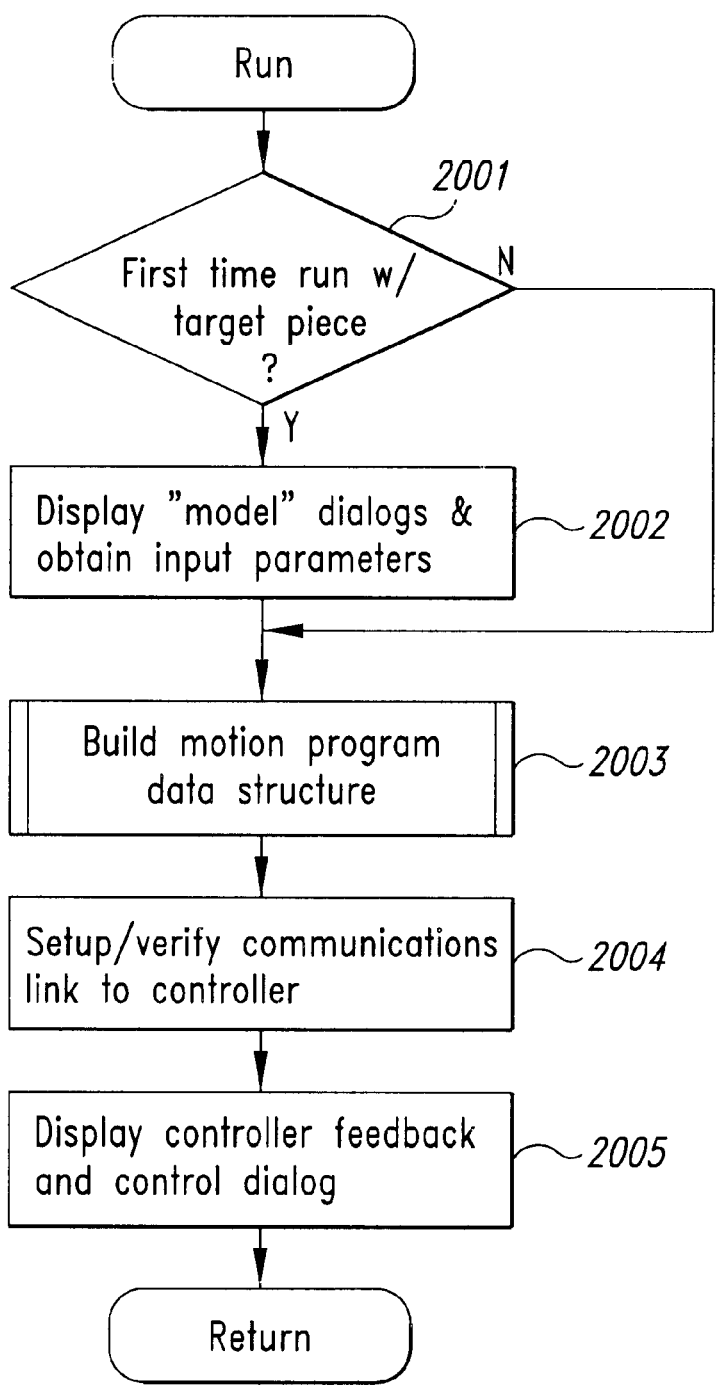
FIG. 20 is an example flow diagram of the automated orientation parameter determination process of an example Dynamic Waterjet Control System.

As discussed with reference to the user interface demonstrated in FIG. 7, when an operator selects the "Run" button from the introductory dialog of the cutting module of the user interface (see e.g., button 704), the DWCS begins the automated orientation parameter determination process. FIG. 20 is an example flow diagram of the automated orientation parameter determination process of an example Dynamic Waterjet Control System. In step 2001, the DWCS determines whether this is the first time that the software has been run to cut this target piece or if any input (process) parameters have changed, and, if so, continues in step 2002, else continues in step 2003. In step 2002, the DWCS displays the model preference dialogs (see, e.g., FIGS. 10–13) and obtains information from the operator regarding what models and or overriding values the operator desires. For example, an operator can use these model preference dialogs to override the speed percentage value for corners even though other parameters may be automatically chosen by the system, for example the lead and taper angles. In step 2003, the DWCS invokes a build motion program data structure routine to query the various models for orientation and process parameter values. In step 2004, the DWCS sets up or verifies that a communication session has been established with the jet controller. In step 2005, the DWCS displays the controller dialog (e.g., see FIG. 14), and returns to await further operator instruction.

Figure 21:
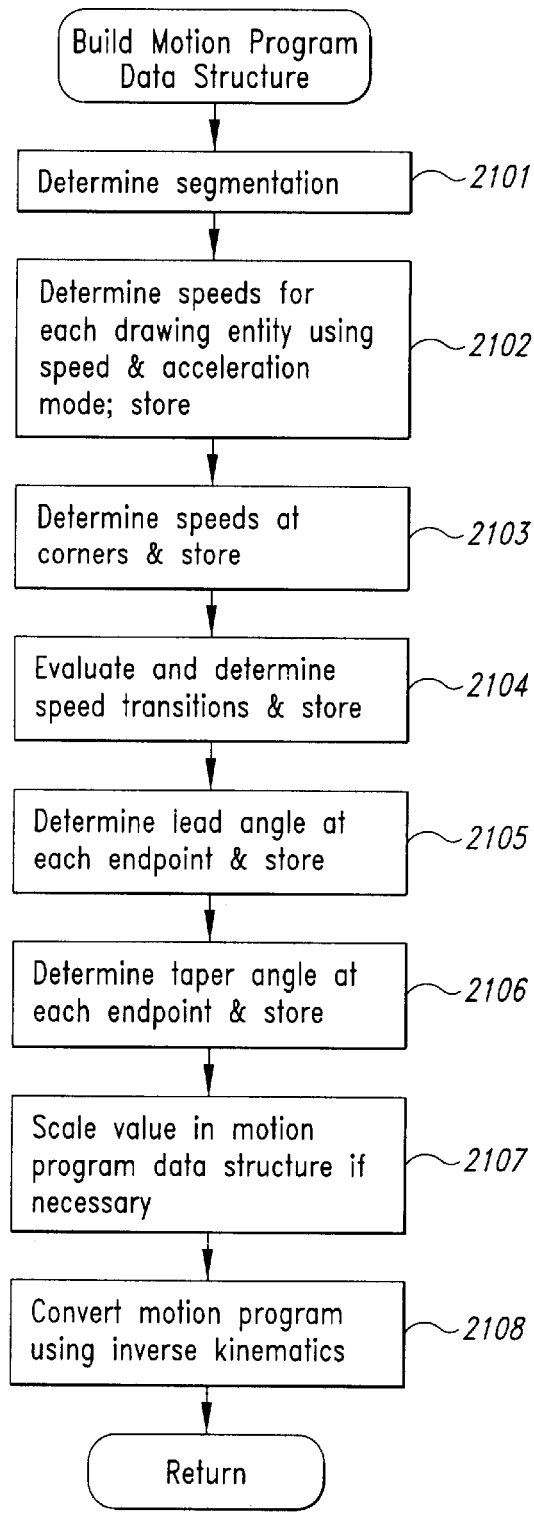
FIG. 21 is an example flow diagram of the steps performed by the Dynamic Waterjet Control System to build a motion program data structure.

FIG. 21 is an example flow diagram of the steps performed by the Dynamic Waterjet Control System to build a motion program data structure. The DWCS examines the geometry that was received for the desired piece and automatically determines, using the models and overriding cutting process parameter values indicated by the operator, the speeds and the orientation of the jet to be used to cut the piece according to the specified customer requirements. These values are stored in a data structure that forms the motion program when it is complete. One skilled in the art will recognize that any appropriate data structure, including a simple array or table, may be used to store the motion program data.

Specifically, in step 2101, the DWCS segments the CAD input into drawing entities. As stated earlier, this step is performed using well-known techniques in the industry and/or off-the-shelf programs. In step 2102, the DWCS determines the cutting speeds to be used for each drawing entity by querying the cutting speed and acceleration model. The model may be implemented as a series of callable functions (equations) or may be implemented as a simple look-up table based upon drawing entity type, jet apparatus restrictions or requirements, and various process parameter values. In any case, external speed and acceleration models may be used in conjunction with the lead and taper model described herein. Preferably, any model used produces the fastest cut speed attainable for the given process parameters (the "separation speed.") For a given jet apparatus and DWCS, the speed model specifies a relationship that relates "slow" and "fast" customer requirements to some given speed. For example, in one example embodiment, a fast cut is considered to be at 100% while a slow cut is typically 20%. Other embodiments refer to "fast" and "slow" on a sliding scale, for example, 1–10. For purposes of illustration, this discussion indicates fast as 100% speed.

Once the fast (100%) speed is determined, the DWCS can assign percentage speed values to other requested speeds. For example, if the speed model invoked by the DWCS returns a value of 10 inches per minute (ipm) for the 100% speed, then, when the model specifies that a second entity should be cut at 1 ipm, the DWCS determines that the second entity should be cut at a 10% speed, since 1 ipm is 1/10th of 10 ipm.

Referring again to the example shown in FIG. 19, the geometric entity "a" is to be cut at fast speed, thus at the 100% speed. Since the operator specified a slow speed for the remaining entities, for purposes of illustration, a speed value of 20% will be assigned to these entities. The motion program data structure values that correspond to the design of FIG. 19 at this point will be similar to those shown in Table 1.

TABLE 1

| Feature | Percentage Speed |
| --- | --- |
| Start | 0 |
| First leg a | 100 |
| Corner A | |
| Second leg b | 20 |
| Corner B | |
| Third leg c | 20 |
| Corner C | |
| Fourth leg d | 20 |
| Finish | 0 |

Once the cutting speeds for geometric entities of the designed part are calculated, then in step 2103, the DWCS checks for speed constraints at each corner, if 15 corners are present. For example, just as a driver slows a car around a corner, the jet cutting head should also slow down. The speed to which the cutting head should be slowed for a particular corner is determined either by operator input or by using the mathematical equations of a corner control model, such as corner model 408 in FIG. 4.

Once corner speeds are determined, all speeds are matched with their respective geometric entities. The motion program data structure values that correspond to the design of FIG. 19 at this point will be similar to those shown in Table 2.

TABLE 2

| Feature | Percentage Speed |
| --- | --- |
| Start | 0 |
| First leg a | 100 |
| Corner A | 10 |
| Second leg b | 20 |
| Corner B | 10 |
| Third leg c | 20 |
| Corner C | 10 |
| Fourth leg d | 20 |
| Finish | 0 |

In step 2104, the DWCS determines how to transition the speed between each drawing entity of the design. For example, referring to FIG. 19 and Table 2, to meet process or machine acceleration constraints, the cutting head may require 0.5 inches to increase from 0% speed at the "Start" to the 100% speed of the first leg (entity "a"). Transitions such as this are calculated by the DWCS for every geometric entity and are based upon the characteristics of the jet apparatus and the type of entity among other process parameters.

The speed transitions may be accomplished by setting acceleration parameters on the controller or by "breaking up" the original CAD design into smaller segments. The DWCS then assigns each one of these segments an incremental change in speed that produces the required speed transition. In an example embodiment, the segment breaking technique is often used.

At this point, the motion program data structure includes the x-y location of every entity or feature and the speed assigned to each entity.

In steps 2105 and 2106, the DWCS uses the lead and taper model to determine the lead and taper angle of each endpoint. An underlying principle of the model is to match the lead and taper angles to the cutting speed so that the jet can be accelerated through the target piece with a resulting straight edge. Moreover, the techniques employed by the model are preferably general enough to support the determination of lead and taper angles for an arbitrary geometric design, and not just for designs for which prior testing has been performed. Also, the techniques described below illustrate lead and taper angles as functions of speed. One skilled in the art will recognize that, since the speed values are themselves functions of other process parameters, equivalent techniques may be used which characterize lead and taper instead as functions of these other process parameters.

The lead and taper model can be implemented as an object (or class) with at least one method, for example, a "getLTAngle" method. In one embodiment, the method receives three input parameters: the cutting speed, the angle of a tangent to the path (at the point of inquiry), and an indication of the direction of the offset. The getLTAngle method includes several techniques (e.g., families of equations or look-up tables) for determining the lead and taper angles, based upon differing values for the cutting head process parameters. In addition, the getLTAngle method incorporates the designated tangent angle to assist in defining smoother transitions in instances where two straight lines intersect, for example, in corners. The designated tangent angle at the intersection/corner is preferably an average of the tangents of each intersecting line. The model uses this tangent angle to determine lead and taper angles at intersections that will result in gentler transitions of the cutting head motion.

Specifically, in step 2105, the DWCS uses the lead and taper model and the motion program data structure compiled thus far to determine the lead angle for each entity end point. First, the model determines drag length. One form of equation to do determine drag length is as follows:

$$d = U\% * \frac{((0.1445 * t) + 0.0539)}{100} \quad (1)$$

where d is the drag length (e.g., in inches), U% is the speed percentage assigned to the entity, and t is the material thickness (e.g., in inches). The coefficients of Equation 1 will vary depending on the thickness range of the material but this is the general form of an equation that can be used by the lead and taper model.

Once the drag length is determined, the model now determines the lead angle $\theta_L$ (e.g., in degrees) by the equation:

$$\theta_L = \arctan\left(\frac{d}{t}\right) \quad (2)$$

where d and t are again the drag length and material thickness, respectively. Various scaling factors may be applied to Equation 2 for materials under 0.25 inches in thickness. Once the lead angle for each endpoint is determined, it is stored by the DWCS in the motion program data structure.

One skilled in the art will recognize that other equations of the general form of Equations 1 and 2 can be used to determine the lead angle and incorporated into the lead and taper model. Any equation form that evaluates to the same or similar values for given material thicknesses (also including a look-up table of discrete values) will operate with the methods and systems of the present invention. In practice, there will be a family of equations in the general form shown that will cover various material thicknesses. The DWCS preferably determines which family of equations to use from the model based upon received process parameters. Basically, any technique for providing a lead angle value for an arbitrary geometry can be used in implementing the lead and taper model of the DWCS.

In step 2106, the DWCS uses the lead and taper model and the motion program data structure compiled thus far to determine the taper angle for each entity end point. First, the model determines the width Wt (e.g., in inches) at the top (the entrance point) of the cut using an equation similar to:

$$Wt = 0.04628 - (0.00015 * U\%) + (0.00125 * t) + (9.06033E - 07 * U\%^2) \quad (3)$$

where U% is the speed percentage assigned to the entity and t is the material thickness. Next, the model determines the width Wb (e.g., in inches) at the bottom (the exit point) of the cut using an equation similar to:

$$Wb = \frac{1}{(20.391548 + (0.434775 * U\%) - (4.650149 * t))} \quad (4)$$

Note that the coefficients of Equations 3 and 4 will vary depending on the process parameter values such as abrasive flow rate, mixing tube length, material etc. Equations 3 and 4 can be expressed more generally as a polynomial of the form:

$$Wt = (d * U\%^2) - (b * U\%) + (c * t) + a \quad (4a)$$

where the coefficients a, b, c and d are determined theoretically, experimentally or by a combination of both. One skilled in the art will recognize that additional terms may be added and that other equations of the general form of Equation 4a can be used to determine the taper angle and incorporated into the lead and taper model. Any equation form that evaluates to the same values for given process parameters (also including a look-up table of discrete values) will operate with the methods and systems of the present invention.

Once the top width and the bottom width have been determined, the model returns the taper angle $\theta_T$ (e.g., in degrees) using an equation of the form:

$$\theta_T = \arctan\left(\frac{(0.5 * (Wt - Wb))}{t}\right) \quad (5)$$

Basically, any technique for providing a taper angle value for an arbitrary geometry can be used in implementing the lead and taper model of the DWCS.

In step 2107, the DWCS optionally scales the values for lead and taper depending upon various operator inputs. For example, under very high speeds (and depending upon the cutting head characteristics), the lead angle corrections may not have any practical effect. In such a situation, the DWCS can scale the lead angle values determined by the model by multiplying them by 0.

At this point, the motion program data structure contains all of the desired geometric entities, cutting speeds, and angle compensations. In step 2108, this data is converted into a motion program instructions. In one embodiment, the DWCS uses inverse kinematic equations to determine the motor joint positions that advance the tool tip along the desired path with the appropriate angles as specified in the data structure. (If there are arcs in the design, this technique typically requires that arcs be converted into line segments before applying the inverse kinematic equations.) The resultant motion program is in a "complex" form in that the lead and taper angles are implicit in the program. The example user interface described above with reference to FIGS. 7–17 corresponds to this embodiment.

In another embodiment of FIG. 21, the inverse kinematics are performed by the controller card after the motion program is downloaded. (Arcs do not need to be converted to lines.) The motion program is more simple and has explicit (and visible) lead and taper values that are read by the controller card and can be displayed in a corresponding controller dialog for feedback purposes.

Figure 22:
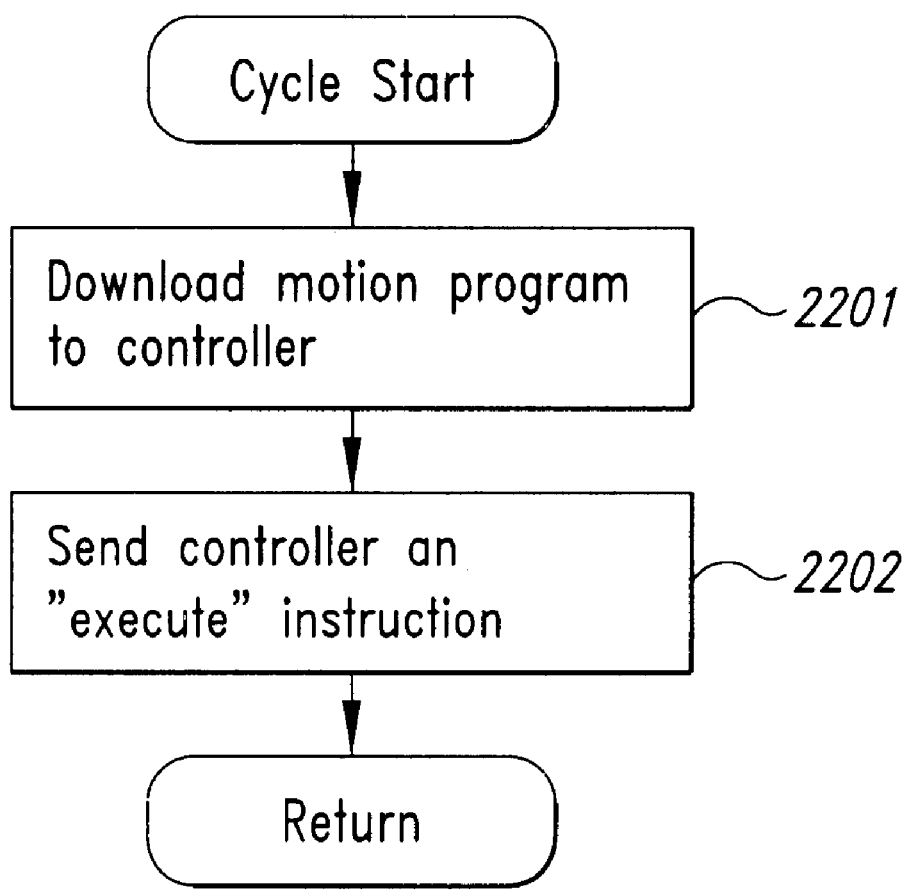
FIG. 22 is an example flow diagram of the steps performed by the Dynamic Waterjet Control System to begin the cutting cycle.

In another embodiment of FIG. 21, the DWCS does not perform one or more of the steps of segmentation of the design (step 2101), or the other steps of assigning speed and angle values to sub-entities of the geometry. Instead, the various models are downloaded into the controller itself. As the controller executes the x-y path of the drawing, the controller consults internally embedded models, such as the speed and acceleration model and the corner model, to determine a next speed when it detects and encounters a new geometric entity. The controller also dynamically adjusts the lead and taper of the cutting head in response to speed feedback relative to the current location and the upcoming location by determining appropriate values from an embedded lead and taper model. Thus, a type of "look-ahead" is provided. As discussed with reference to FIG. 14, once the controller feedback and control screen is displayed, an operator preferably selects the cycle start button (see e.g., button 1404) to cause the jet apparatus to actually begin cutting the workpiece. FIG. 22 is an example flow diagram of the steps performed by the Dynamic Waterjet Control System to begin the cutting cycle. In step 2201, the DWCS downloads the motion program to the controller (e.g., controller computer or card). In step 2202, the DWCS sends an instruction to the controller to indicate that the controller should begin executing the motion program, and then returns. As the controller advances through the motion program, it smoothly transitions between all angles and speeds.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to the other arrangements of fluid jet systems, such as systems in which a portion or the entire input, automation and control logic is embedded in a controller, or with systems having different axis cutting heads. In addition, the teachings may be applied to other types of modeling or to models based upon process parameters other than speed. In addition, the teachings may be applied to alternative control arrangements such as residing on a remote control device such as a device connected to the jet apparatus via wireless, networked, or any type of communications channel. These and other changes may be made to the invention in light of the above detailed description. Accordingly, the invention is not limited by the disclosure, but instead the scope of the present invention is to be determined by the following claims.

What is claimed is:

1. A method in a computer system for automatically and dynamically controlling orientation of a cutting head of a fluid jet apparatus relative to a material being cut, to produce a target piece having a geometry with a plurality of geometric entities, the fluid jet apparatus having a plurality of process parameters, comprising:

receiving an indication of a speed for each of the plurality of geometric entities of the geometry, wherein at least two geometric entities are associated with different speeds;

automatically and dynamically determining an orientation parameter for each geometric entity in accordance with the indicated speed and the plurality of process parameters; and automatically controlling the motion of the cutting head in accordance with the automatically determined orientation parameter to cut the material to produce the target piece.

2. The method of claim 1 wherein the at least two entities associated with different speeds are ordered successively such that the two different speeds indicate one of an acceleration and a deceleration.

3. The method of claim 2 wherein the orientation parameters for each of the two successive entities are different.

4. The method of claim 2 wherein the orientation parameters for each of the two successive entities are the same.

5. The method of claim 1 wherein the orientation parameter comprises a taper angle.

6. The method of claim 1 wherein the orientation parameter comprises a lead angle.

7. The method of claim 1 further comprising:

automatically determining a second orientation parameter for each determined speed in accordance with the determined speed and the plurality of process parameters; and controlling the motion of the cutting head in accordance with both automatically determined orientation parameters.

8. The method of claim 7 wherein the determined first and second orientation parameters comprise a lead angle and a taper angle.

9. The method of claim 1 wherein the automatically controlling the motion of the cutting head further comprises:

generating a motion program that indicates the automatically determined orientation parameter for each geometric entity; and forwarding the motion program to a controller of the cutting head; and causing the controller to execute the motion program.

10. The method of claim 9 wherein the motion program is tailored to the cutting head controller.

11. The method of claim 9 wherein the motion program comprises a plurality of command sequences with an x-y location and at least one of a taper angle compensation value and a lead angle compensation value, so that corrections to the target cut are made transparent to an operator of the jet apparatus.

12. The method of claim 9 wherein the motion program comprises a plurality of command sequences that indicate inverse kinematics to control the cutting head according to an x-y location and at least one of a taper angle and a lead angle, in a manner that is transparent to an operator of the jet apparatus.

13. The method of claim 1 wherein a predictive model of a cut based upon changing one of a lead angle and a taper angle is used by the computer system to automatically determine the orientation parameter for each determined speed.

14. The method of claim 13 wherein the predictive model indicates values for at least one of lead angles and taper angles as a function of values of speed.

15. The method of claim 14 wherein the function of speed is further defined as a function of one of the process parameters.

16. The method of claim 15 wherein the process parameter is at least one of abrasive flow rate, nozzle orifice diameter, mixing tube characteristics, fluid pressure, material thickness, and material type.

17. The method of claim 13 wherein the predictive model indicates values for at least one of lead angles and taper angles as a function of values of acceleration.

18. The method of claim 13 wherein the predictive model indicates values for at least one of lead angles and taper angles as a function of values of deceleration.

19. The method of claim 13 wherein the predictive model indicates values for lead angles and taper angles as a function of values of speed.

20. The method of claim 13 wherein the predictive model data is stored in a dynamically modifiable library of code.

21. The method of claim 13 wherein the predictive model is represented as a polynomial equation.

22. The method of claim 13 wherein the predictive model is based upon a lookup table of discrete values.

23. The method of claim 1 wherein the cutting head is controlled by motion around at least 4 axes.

24. The method of claim 23 wherein the axes provide tilt and swivel movement of the cutting head relative to the target piece.

25. The method of claim 1 wherein the cutting head is controlled by motion around at least 5 axes.

26. The method of claim 25 wherein the axes provide tilt and swivel movement of the cutting head relative to the target piece.

27. The method of claim 1 wherein the fluid jet apparatus is an abrasive water jet.

28. The method of claim 1 wherein the fluid jet apparatus is a high pressure fluid jet.

29. The method of claim 1 wherein the forwarding the motion program to the controller of the cutting head further comprises:
communicating the motion program to the controller of the cutting head.

30. A computer-readable memory medium containing instructions that control a computer processor to control orientation of a cutting head of a fluid jet apparatus relative to a material being cut, to produce a target piece having a geometry with a plurality of geometric entities, the fluid jet apparatus having a plurality of process parameters, by:
receiving an indication of speed for each of the plurality of geometric entities of the geometry, wherein at least two geometric entities are associated with different speeds;
automatically and dynamically determining an orientation parameter for each geometric entity in accordance with the indicated speed and the plurality of process parameters; and
automatically controlling the motion of the cutting head in accordance with the automatically determined orientation parameter to cut the material to produce the target piece.

31. The computer-readable memory medium of claim 30 wherein the at least two entities associated with different speeds are ordered successively such that the two different speeds indicate one of an acceleration and a deceleration.

32. The computer-readable memory medium of claim 31 wherein the orientation parameters for each of the two successive entities are different.

33. The computer-readable memory medium of claim 31 wherein the orientation parameters for each of the two successive entities are the same.

34. The computer-readable memory medium of claim 30 wherein the orientation parameter comprises a taper angle.

35. The computer-readable memory medium of claim 30 wherein the orientation parameter comprises a lead angle.

36. The computer-readable memory medium of claim 30, further comprising instructions that control the computer processor by:
automatically determining a second orientation parameter for each determined speed in accordance with the determined speed and the plurality of process parameters; and
controlling the motion of the cutting head in accordance with both automatically determined orientation parameters.

37. The computer-readable memory medium of claim 36 wherein the determined first and second orientation parameters comprise a lead angle and a taper angle.

38. The computer-readable memory medium of claim 30 wherein the automatically controlling the motion of the cutting head further comprises:
generating a motion program that indicates the automatically determined orientation parameter for each geometric entity; and
forwarding the motion program to a controller of the cutting head; and
causing the controller to execute the motion program.

39. The computer-readable memory medium of claim 38 wherein the motion program is tailored to the cutting head controller.

40. The computer-readable memory medium of claim 38 wherein the motion program comprises a plurality of command sequences with an x-y location and at least one of a taper angle compensation value and a lead angle compensation value, so that corrections to the target cut are made transparent to an operator of the jet apparatus.

41. The computer-readable memory medium of claim 38 wherein the motion program comprises a plurality of command sequences that indicate inverse kinematics to control the cutting head according to an x-y location and at least one of a taper angle and a lead angle, in a manner that is transparent to an operator of the jet apparatus.

42. The computer-readable memory medium of claim 30 wherein a predictive model of a cut based upon changing one of a lead angle and a taper angle is used by the computer system to automatically determine the orientation parameter for each determined speed.

43. The computer-readable memory medium of claim 42 wherein the predictive model indicates values for one of lead angles and taper angles as a function of values of speed.

44. The computer-readable memory medium of claim 43 wherein the function of speed is further defined as a function of one of the process parameters.

45. The computer-readable memory medium of claim 44 wherein the process parameter is at least one of abrasive flow rate, nozzle orifice diameter, mixing tube characteristics, fluid pressure, material thickness, and material type.

46. The computer-readable memory medium of claim 42 wherein the predictive model indicates values for at least one of lead angles and taper angles as a function of values of acceleration.

47. The computer-readable memory medium of claim 42 wherein the predictive model indicates values for at least one of lead angles and taper angles as a function of values of deceleration.

48. The computer-readable memory medium of claim 42 wherein the predictive model indicates values for lead angles and taper angles as a function of values of speed.

49. The computer-readable memory medium of claim 42 wherein the predictive model data is stored in a dynamically modifiable library of code.

50. The computer-readable memory medium of claim 42 wherein the predictive model is represented as a polynomial equation.

51. The computer-readable memory medium of claim 42 wherein the predictive model is based upon a lookup table of discrete values.

52. The computer-readable memory medium of claim 30 wherein the cutting head is controlled by motion around at least 4 axes.

53. The computer-readable memory medium of claim 52 wherein the axes provide tilt and swivel movement of the cutting head relative to the target piece.

54. The computer-readable memory medium of claim 30 wherein the cutting head is controlled by motion around at least 5 axes.

55. The computer-readable memory medium of claim 54 wherein the axes provide tilt and swivel movement of the cutting head relative to the target piece.

56. The computer-readable memory medium of claim 30 wherein the fluid jet apparatus is an abrasive water jet.

57. The computer-readable memory medium of claim 30 wherein the fluid jet apparatus is a high pressure fluid jet.

58. The computer-readable memory medium of claim 30 wherein the forwarding the motion program to the controller of the cutting head further comprises:
   communicating the motion program to the controller of the cutting head.

59. A dynamic fluid jet control system that controls a fluid jet apparatus to produce from a material a target piece with a geometry having a plurality of geometric segments, the fluid jet apparatus having a cutting head that rotates on a plurality of axes, comprising:
   cutting head control interface that communicates a plurality of orientation values to the cutting head of the fluid jet apparatus to orient the cutting head with respect to the plurality of axes to cut the target piece; and
   lead and taper modeling component that
      automatically and dynamically determines a plurality of orientation values for each of a plurality of segments of the geometry in accordance with a determined cutting head speed associated with that segment, at least two segments having associated speeds that are different; and
      forwards the determined plurality of orientation values for each segment to the cutting head control interface to control the orientation of the cutting head.

60. The system of claim 59 wherein the at least two segments associated with different speeds are ordered successively such that the two different speeds indicate one of an acceleration and a deceleration.

61. The system of claim 60 wherein the determined orientation values for each of the two successive entities are different.

62. The system of claim 60 wherein the determined orientation values for each of the two successive entities are the same.

63. The system of claim 59 wherein the cutting head control interface and the lead and taper modeling component are embedded in a computer numeric controller of a fluid jet apparatus.

64. The system of claim 59 wherein the automatically determined plurality of orientation values includes lead angle values.

65. The system of claim 64 wherein the automatically determined plurality of orientation values includes taper angle values.

66. The system of claim 64 wherein the automatically determined plurality of orientation values includes standoff compensation values.

67. The system of claim 59 wherein the automatically determined plurality of orientation values includes taper angle values.

68. The system of claim 67 wherein the automatically determined plurality of orientation values includes standoff compensation values.

69. The system of claim 59 wherein the jet fluid apparatus is a greater than three axis system.

70. The system of claim 59 wherein the lead and taper modeling component comprises a data structure having a function that determines lead angles and taper angles based upon process parameters.

71. The system of claim 70 wherein the function determines lead angles and taper angles based upon values representing at least one of speed, acceleration, and deceleration.

72. The system of claim 59 wherein the lead and taper modeling component comprises a data structure that represents a lookup table of discrete values that can be used to predict lead angles and taper angles based upon process parameters.

73. The system of claim 59 wherein the lead and taper modeling component automatically determines the plurality of orientation values for each of the plurality of segments of the geometry in accordance with a plurality of process parameters.

74. The system of claim 73 wherein the process parameters comprise at least one of abrasive flow rate, nozzle orifice diameter, mixing tube characteristics, fluid pressure, material thickness, and material type.

75. The system of claim 59 wherein the fluid jet apparatus is a water jet apparatus.

76. The system of claim 59 wherein the fluid jet apparatus is a high pressure apparatus.

77. The system of claim 59 wherein the fluid jet apparatus is a low pressure apparatus.

78. A method in a computer system for controlling a jet apparatus to cut along a designated cutting path of a material to produce a target piece having a geometric specification, the jet apparatus having a cutting head and a plurality of modifiable process parameters; comprising:
   retrieving a representation of a predictive data model that models the effects of values of at least one orientation characteristic of the cutting head on a cut produced using those values;
   automatically and dynamically determining a plurality of values for the at least one orientation characteristic from the retrieved data model representation in accordance with values of the process parameters; and
   using the determined plurality of values for the at least one orientation characteristic to control the jet apparatus to cut along the designated path to produce the target piece.

79. The method of claim 78, the geometric specification comprising a plurality of geometric entities, wherein the automatically determining the plurality of values further comprises, for each entity:

determining a speed that corresponds to a geometric entity; and using the retrieved representation of the predictive data model to automatically determine a value for the orientation characteristic in accordance with the determined speed.

80. The method of claim 79, wherein the automatically determining of the value for the orientation characteristic in accordance with the determined speed also determines the value in accordance with the process parameter values.

81. The method of claim 79 wherein two of the geometric entities are ordered successively and have different corresponding speeds, thereby indicating one of an acceleration and a deceleration of the jet apparatus.

82. The method of claim 78 wherein the steps are performed by a controller of the jet apparatus.

83. The method of claim 78 wherein the using the determined values to control the jet apparatus further comprises:

generating a motion program to control the jet apparatus, the motion program indicating the determined plurality of values for the orientation characteristic; and executing the motion program to cause the jet apparatus to cut along the desired path.

84. The method of claim 78 wherein the orientation characteristic is a lead angle of a jet stream of the cutting head relative to the material.

85. The method of claim 78 wherein the orientation characteristic is a taper angle of a jet stream of the cutting head relative to the material.

86. The method of claim 78 wherein the representation of the predictive data model is a programmed function that returns values based upon evaluation of a mathematical equation.

87. The method of claim 86 wherein the mathematical equation is an equation expressed as a function of speed.

88. The method of claim 87, the equation having coefficients, wherein the values of the coefficients are based upon values of the process parameters.

89. The method of claim 87, the equation having coefficients, wherein the values of the coefficients vary with thickness of the material.

90. The method of claim 87 wherein the equation is a polynomial equation.

91. The method of claim 78 wherein the representation of the predictive data model is a look-up table of discrete values and the automatically determining the plurality of values determines values that are derived from the discrete values.

92. A computer-readable memory medium containing instructions that control a computer processor to control a jet apparatus to cut along a designated cutting path of a material to produce a target piece having a geometric specification, the jet apparatus have a cutting head and a plurality of modifiable process parameters, by:

retrieving a representation of a predictive data model that models the effects of values of at least one orientation characteristic of the cutting head on a cut produced using those values;

automatically and dynamically determining a plurality of values for the at least one orientation characteristic from the retrieved data model representation in accordance with values of the process parameters; and using the determined plurality of values for the at least one orientation characteristic to control the jet apparatus to cut along the designated path to produce the target piece.

93. The computer-readable memory medium of claim 92, the geometric specification comprising a plurality of geometric entities, wherein the automatically determining the plurality of values further comprises, for each entity:

determining a speed that corresponds to a geometric entity; and using the retrieved representation of the predictive data model to automatically determine a value for the orientation characteristic in accordance with the determined speed.

94. The computer-readable memory medium of claim 93 wherein the automatically determining of the value for the orientation characteristic in accordance with the determined speed also determines the value in accordance with the process parameter values.

95. The computer-readable memory medium of claim 93 wherein two of the geometric entities are ordered successively and have different corresponding speeds, thereby indicating one of an acceleration and a deceleration of the jet apparatus.

96. The computer-readable memory medium of claim 92 wherein the steps are performed by a controller of the jet apparatus.

97. The computer-readable memory medium of claim 92 wherein the using the determined values to control the jet apparatus further comprises:

generating a motion program to control the jet apparatus, the motion program indicating the determined plurality of values for the orientation characteristic; and executing the motion program to cause the jet apparatus to cut along the desired path.

98. The computer-readable memory medium of claim 92 wherein the orientation characteristic is a lead angle of a jet stream of the cutting head relative to the material.

99. The computer-readable memory medium of claim 92 wherein the orientation characteristic is a taper angle of a jet stream of the cutting head relative to the material.

100. The computer-readable memory medium of claim 92 wherein the representation of the predictive data model is a programmed function that returns values based upon evaluation of a mathematical equation.

101. The computer-readable memory medium of claim 100 wherein the mathematical equation is an equation expressed as a function of speed.

102. The computer-readable memory medium of claim 101, the equation having coefficients, wherein the values of the coefficients are based upon values of the process parameters.

103. The computer-readable memory medium of claim 101, the equation having coefficients, wherein the values of the coefficients vary with thickness of the material.

104. The computer-readable memory medium of claim 101 wherein the equation is a polynomial equation.

105. The computer-readable memory medium of claim 92 wherein the representation of the predictive data model is a look-up table of discrete values and the automatically determining the plurality of values determines values that are derived from the discrete values.

106. A fluid jet apparatus controller for controlling a cutting head of a fluid jet apparatus to cut along a designated cutting path to produce a target piece, comprising:

memory that contains a predictive data model of the effects of values of an orientation characteristic of the cutting head on a cut produced using those values; and cutting head control portion that
retrieves the predictive data model from the memory;
automatically determines a plurality of values for the orientation characteristic from the retrieved data model in accordance with the designated cutting path; and
uses the determined plurality of values for the orientation characteristic to control the cutting head of the jet apparatus to cut along the designated path to produce the target piece.

107. The controller of claim 106 wherein the designated cutting path comprises segments, and wherein the cutting head control portion automatically determines the plurality of values for the orientation characteristic by:
for each segment,
determining a desired cutting speed that corresponds to the segment; and
using the retrieved data model to automatically determine a value for the orientation characteristic that corresponds to the desired cutting speed.

108. The controller of claim 106 wherein the cutting head control portion uses the determined plurality of values of the orientation characteristic to control the cutting by generating motion instructions that cause the cutting head to cut along the designated path.

109. The controller of claim 106 wherein the orientation characteristic is a lead angle of a jet stream of the cutting head.

110. The controller of claim 106 wherein the orientation characteristic is a taper angle of a jet stream of the cutting head.

111. The controller of claim 106 wherein the predictive data model is a data structure having a program code that returns orientation characteristic values.

112. The controller of claim 111 wherein the program code calculates values based upon an equation that indicates orientation values as a function of speed.

113. The controller of claim 112, the equation having a coefficient, wherein a value of the coefficient is based upon a value of a process parameter.

114. The controller of claim 112 wherein the equation is a polynomial equation.

115. The controller of claim 106 wherein the predictive data model is a data structure that represents a lookup table of discrete values.

116. A fluid jet apparatus control system for controlling a cutting head of a fluid jet apparatus to cut along a designated cutting path to produce a target piece, comprising:
memory that contains a predictive data model of the effects of values of an orientation characteristic of the cutting head on a cut produced using those values; and
cutting head control interface that
retrieves the predictive data model from the memory;
automatically determines a plurality of values for the orientation characteristic from the retrieved data model in accordance with the designated cutting path; and
uses the determined plurality of values for the orientation characteristic to control the cutting head of the jet apparatus to cut along the designated path to produce the target piece.

117. The control system of claim 116 wherein the designated cutting path comprises segments, and wherein the cutting head control interface automatically determines the plurality of values for the orientation characteristic by:
for each segment,
determining a desired cutting speed that corresponds to the segment; and
using the retrieved data model to automatically determine a value for the orientation characteristic that corresponds to the desired cutting speed.

118. The control system of claim 116 wherein the cutting head control interface uses the determined plurality of values of the orientation characteristic to control the cutting by generating motion instructions that cause the cutting head to cut along the designated path.

119. The control system of claim 116 wherein the orientation characteristic is a lead angle of a jet stream of the cutting head.

120. The control system of claim 116 wherein the orientation characteristic is a taper angle of a jet stream of the cutting head.

121. The control system of claim 116 wherein the predictive data model is a data structure having a program code that returns orientation characteristic values.

122. The control system of claim 121 wherein the program code calculates values based upon an equation that indicates orientation values as a function of speed.

123. The control system of claim 122, the equation having a coefficient, wherein a value of the coefficient is based upon a value of a process parameter.

124. The control system of claim 122 wherein the equation is a polynomial equation.

125. The control system of claim 116 wherein the predictive data model is a data structure that represents a lookup table of discrete values.

126. A computer-implemented method for automatically and dynamically controlling three dimensional orientation of a cutting head of a fluid jet apparatus relative to a material being cut, to produce a target piece having a geometry with a plurality of geometric entities, the fluid jet apparatus having a plurality of process parameters, comprising:
receiving an indication of a value of one of the process parameters for each of the plurality of geometric entities of the geometry, wherein at least two geometric entities are associated with different values of the one of the process parameters;
automatically and dynamically determining an orientation parameter for each geometric entity in accordance with the indicated process parameter value, the orientation parameter used to control at least one of tilt and swivel of the cutting head; and
automatically controlling the motion of the cutting head in accordance with the automatically determined orientation parameter to cut the material to produce the target piece.

127. The method of claim 126 wherein the receiving the indication of the value of one of the process parameter for each of the plurality of geometric entities further comprises:
receiving an indication of speed for each of the plurality of geometric entities, wherein at least two geometric entities are associated with different speeds.

128. The method of claim 127 wherein the at least two entities associated with different speeds are ordered successively such that the two different speeds indicate one of an acceleration and a deceleration.

129. The method of claim 128 wherein the automatically and dynamically determining the orientation parameter for each entity in accordance with the speed further comprises:
automatically and dynamically determining the orientation parameter for each entity in accordance with the speed such that speed of cutting the material is maximized.

130. The method of claim 126 wherein the automatically and dynamically determining the orientation parameter for each geometric entity further comprises:

automatically and dynamically determining a taper angle for cutting each geometric entity in accordance with the indicated process parameter value.

131. The method of claim 126 wherein the automatically and dynamically determining the orientation parameter for each geometric entity further comprises:
   automatically and dynamically determining a lead angle for cutting each geometric entity in accordance with the indicated process parameter value.

132. The method of claim 126 wherein the automatically and dynamically determining the orientation parameter for each geometric entity further comprises:
   automatically and dynamically determining a lead angle and a taper angle for cutting each geometric entity in accordance with the indicated process parameter value.

133. The method of claim 126 wherein the automatically controlling the motion of the cutting head in accordance with the automatically determined orientation parameter to cut the material to produce the target piece further comprises:
   generating movement instructions that indicate the automatically determined orientation parameter for each geometric entity; and
   causing the movement of the cutting head to be oriented according to the generated movement instructions.

134. The method of claim 133 wherein the automatically determined orientation parameter is at least one of a lead angle and a taper angle.

135. The method of claim 133 wherein the automatically and dynamically determining the orientation parameter for each geometric entity further comprises:
   automatically and dynamically determining a lead angle and a taper angle for cutting each geometric entity in accordance with the indicated process parameter value.

136. The method of claim 133 wherein the generated movement instructions comprise a motion program that controls a controller of a cutting head.

137. The method of claim 136 where the controller is part of the apparatus that includes the cutting head.

138. The method of claim 126 wherein the automatically determining the orientation parameter for each geometric entity further comprises:
   automatically and dynamically determining an orientation parameter by using a predictive model of a cut based upon changing one of a lead angle and a taper angle.

139. The method of claim 138 wherein the predictive model indicates values for the one of the lead angle and the taper angle as a function of values of speed.

140. The method of claim 138 wherein the predictive model is represented as at least one of a polynomial equation and a lookup data structure of discrete values.

141. The method of claim 126 wherein the cutting head is controlled by motion around at least 4 axes.

142. A computer-readable memory medium that contains instructions for controlling a computer processor to automatically and dynamically control three dimensional orientation of a cutting head of a fluid jet apparatus relative to a material being cut, to produce a target piece having a geometry with a plurality of geometric entities, the fluid jet apparatus having a plurality of process parameters, by:
   receiving a value of one of the process parameters for each of the plurality of geometric entities of the geometry, wherein at least two geometric entities are associated with different values of the one of the process parameters;
   automatically and dynamically determining an orientation parameter for each geometric entity in accordance with the indicated process parameter value, the orientation parameter used to control at least one of tilt and swivel of the cutting head; and
   automatically controlling the motion of the cutting head in accordance with the automatically determined orientation parameter to cut the material to produce the target piece.

143. The memory medium of claim 142 wherein the instructions to receive the indication of the value of one of the process parameter for each of the plurality of geometric entities further control the computer processor by:
   receiving an indication of speed for each of the plurality of geometric entities, wherein at least two geometric entities are associated with different speeds.

144. The memory medium of claim 143 wherein the at least two entities associated with different speeds are ordered successively such that the two different speeds indicate one of an acceleration and a deceleration.

145. The memory medium of claim 144 wherein the instructions to automatically and dynamically determine the orientation parameter for each entity in accordance with the speed further control the computer processor by:
   automatically and dynamically determining the orientation parameter for each entity in accordance with the speed such that speed of cutting the material is maximized.

146. The memory medium of claim 142 wherein the automatically and dynamically determining the orientation parameter for each geometric entity further comprises:
   automatically and dynamically determining a taper angle for each geometric entity in accordance with the indicated process parameter value.

147. The memory medium of claim 142 wherein the automatically and dynamically determining the orientation parameter for each geometric entity further comprises:
   automatically and dynamically determining a lead angle for each geometric entity in accordance with the indicated process parameter value.

148. The memory medium of claim 142 wherein the automatically and dynamically determining the orientation parameter for each geometric entity further comprises:
   automatically and dynamically determining a lead angle and a taper angle for each geometric entity in accordance with the indicated process parameter value.

149. The memory medium of claim 142 wherein the instructions to automatically control the motion of the cutting head in accordance with the automatically determined orientation parameter to cut the material to produce the target piece further control the computer processor by:
   generating movement instructions that indicate the automatically determined orientation parameter for each geometric entity; and
   causing the movement of the cutting head to be oriented according to the generated movement instructions.

150. The memory medium of claim 149 wherein the automatically determined orientation parameter is at least one of a lead angle and a taper angle.

151. The memory medium of claim 149 wherein the instructions to automatically and dynamically determine the orientation parameter for each geometric entity further control the computer processor by:
   automatically and dynamically determining a lead angle and a taper angle for each geometric entity in accordance with the indicated process parameter value.

152. The memory medium of claim 149 wherein the generated movement instructions comprise a motion program that controls a controller of a cutting head.

153. The memory medium of claim 152 where the controller is part of the apparatus that includes the cutting head.

154. The memory medium of claim 142 wherein the instructions to automatically and dynamically determine the orientation parameter for each geometric entity further control the computer processor by:
automatically and dynamically determining an orientation parameter by using a predictive model of a cut based upon changing one of a lead angle and a taper angle.

155. The memory medium of claim 152 wherein the predictive model indicates values for the one of the lead angle and the taper angle as a function of values of speed.

156. The memory medium of claim 152 wherein the predictive model is represented as at least one of a polynomial equation and a lookup data structure of discrete values.

157. The memory medium of claim 142 wherein the cutting head is controlled by motion around at least 4 axes.

158. A dynamic fluid jet control system that controls a fluid jet apparatus to produce from a material a target piece with a geometry having a plurality of geometric segments, the fluid jet apparatus having a cutting head that rotates on a plurality of axes, comprising:
cutting head control interface that communicates a plurality of orientation values to the cutting head of the fluid jet apparatus to orient the cutting head in three dimensions with respect to the plurality of axes to cut the target piece; and
lead and taper modeling component that is structured to:
automatically and dynamically determines a plurality of orientation values for each of a plurality of segments of the geometry in accordance with a value of a process parameter associated with that segment, at least two segments having an associated value of the process parameter that are different; and
forwards the determined plurality of orientation values for each segment to the cutting head control interface to control the orientation of the cutting head.

159. The system of claim 158 wherein the process parameter for each of the plurality of geometric segments indicates a speed and wherein the at least two geometric segments are associated with different speeds.

160. The system of claim 159 wherein the at least two geometric segments associated with different speeds are ordered successively such that the two different speeds indicate one of an acceleration and a deceleration.

161. The system of claim 160 wherein the lead and taper modeling component is further structured to:
automatically and dynamically determine the orientation values associated with each segment in accordance with the speed such that speed of cutting the material is maximized.

162. The system of claim 158 wherein one of the automatically and dynamically determined orientation values for each geometric segment is a taper angle value for cutting each geometric segment in accordance with the process parameter value.

163. The system of claim 158 wherein one of the automatically and dynamically determined orientation values for each geometric segment is a lead angle value for cutting each geometric segment in accordance with the process parameter value.

164. The system of claim 158 wherein the lead and taper modeling component is further structured to:
automatically and dynamically determine a lead angle and a taper angle for cutting each geometric segment in accordance with the process parameter value.

165. The system of claim 158 wherein the orientation values for each segment are forwarded to the cutting head control interface as movement instructions that cause the movement of the cutting head to be oriented according to the orientation values.

166. The system of claim 165 wherein the automatically determined orientation values include at least one of a lead angle and a taper angle.

167. The system of claim 165 wherein the movement instructions comprise a motion program that controls a controller of a cutting head.

168. The system of claim 167 where the controller is part of the apparatus that includes the cutting head.

169. The system of claim 158 wherein the lead and taper modeling component is further structured to:
automatically and dynamically determine the plurality of orientation values using a predictive model of a cut based upon changing at least one of a lead angle and a taper angle.

170. The system of claim 169 wherein the predictive model indicates values for the at least one of the lead angle and the taper angle as a function of values of speed.

171. The system of claim 169 wherein the predictive model is represented as at least one of a polynomial equation and a lookup data structure of discrete values.

172. The system of claim 158 wherein the cutting head is controlled by motion around at least 4 axes.

* * * * *

UNITED STATES PATENT AND TRADEMARK OFFICE
CERTIFICATE OF CORRECTION

PATENT NO. : 6,766,216 B2 Page 1 of 1
DATED : July 20, 2004
INVENTOR(S) : Glenn A. Erichsen et al.

It is certified that error appears in the above-identified patent and that said Letters Patent is hereby corrected as shown below:

<u>Title page,</u>
Item [75], Inventors, "Glenn A. Erichsen, Everett, WA (US); Jiannan Zhou, Renton, WA (US); Mira K. Sahney, Seattle, WA (US); Michael Knaupp, Zaisenhausen (DE)" should read -- Glenn A. Erichsen, Everett, WA (US); Jiannan Zhou, Renton, WA (US): Mira K. Sahney, Seattle, WA (US); Michael Knaupp, Zaisenhausen (DE); Charles D. Burnham, Southbury, CT (US); Mohamed A. Hashish, Bellevue, WA (US) --.

Signed and Sealed this

Twenty-eighth Day of December, 2004

JON W. DUDAS
*Director of the United States Patent and Trademark Office*